(12) United States Patent
Yada

(10) Patent No.: US 7,281,016 B2
(45) Date of Patent: Oct. 9, 2007

(54) ELECTRONIC INFORMATION MANAGEMENT SERVER, ELECTRONIC INFORMATION MANAGEMENT CLIENT, ELECTRONIC INFORMATION MANAGEMENT METHOD AND RECORDING MEDIUM FOR RECORDING ELECTRONIC INFORMATION MANAGEMENT PROGRAM

(75) Inventor: Shinichi Yada, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 414 days.

(21) Appl. No.: 09/977,306

(22) Filed: Oct. 16, 2001

(65) Prior Publication Data

US 2002/0052872 A1 May 2, 2002

(30) Foreign Application Priority Data

Oct. 27, 2000 (JP) .............................. 2000-327970

(51) Int. Cl.
*G06F 17/00* (2006.01)

(52) U.S. Cl. .................. 707/102; 707/101; 707/103 R; 707/104.1; 715/530

(58) Field of Classification Search ............. 707/1–10, 707/100–104.1, 200–206; 715/50–501, 517–542; 709/203–207; 706/200–206
See application file for complete search history.

(56) References Cited

U.S. PATENT DOCUMENTS

| | | | | |
|---|---|---|---|---|
| 5,550,977 A | * | 8/1996 | Hiraizumi | 709/213 |
| 5,659,639 A | * | 8/1997 | Mahoney et al. | 382/309 |
| 5,708,834 A | * | 1/1998 | Sasaki et al. | 709/203 |
| 5,987,498 A | * | 11/1999 | Athing et al. | 709/203 |
| 6,434,533 B1 | * | 8/2002 | Fitzgerald | 705/10 |
| 6,601,088 B1 | * | 7/2003 | Kelley et al. | 709/206 |
| 6,620,207 B1 | * | 9/2003 | Lin | 715/536 |
| 6,701,346 B1 | * | 3/2004 | Klein | 709/206 |
| 6,801,902 B1 | * | 10/2004 | David | 707/1 |
| 6,999,614 B1 | * | 2/2006 | Bakker et al. | 382/159 |
| 2002/0007402 A1 | * | 1/2002 | Huston et al. | 709/217 |

* cited by examiner

*Primary Examiner*—Isaac Woo
(74) *Attorney, Agent, or Firm*—Oliff & Berridge PLC

(57) ABSTRACT

To secure the capacity of a storing unit by quickly searching and deleting unnecessary electronic information from the storing unit, an electronic information management server has a feature extracting unit extracting a feature of electronic information stored in a storing unit connected to a network, a deciding unit that decides whether the electronic information is to be deleted from the feature extracted by the feature extracting unit based on an instruction from a client, and a deleting unit that deletes from the storing unit via the network the electronic information decided to be deleted by the deciding unit.

25 Claims, 27 Drawing Sheets

ELECTRONIC INFORMATION MANAGEMENT SERVER, ELECTRONIC INFORMATION MANAGEMENT CLIENT, ELECTRONIC INFORMATION MANAGEMENT METHOD AND RECORDING MEDIUM FOR RECORDING ELECTRONIC INFORMATION MANAGEMENT PROGRAM

BACKGROUND OF THE INVENTION

1. Field of the Invention

The present invention relates to an electronic information management server that manages a storing unit in which a document image generated by scanning a paper document and an electronic document created using application software that operates on a personal computer are stored, an electronic information management client, and a computer-readable recording medium in which an electronic information management method and an electronic information management program are recorded.

2. Description of the Related Art

The form of conventional information storage is usually implemented by filing a paper document. The information storage by the filing of this paper document is excellent in easy reading, easy handling, and convenience of portability. Particularly, it is excellent in intuitive comprehensibility. Accordingly, even today, the filing of the paper document is continuously being used in offices.

The creation method of such a paper document was by handwriting in the past. With the spread of a personal computer (hereinafter referred to as "PC"), however, a paper document is usually created as electronic information using application software on a PC.

Since electronic information has a characteristic that makes it easy to systematically manage by computers, an electronic information management system that uses this characteristic can be constructed. The storage form of this electronic information is implemented in such a form as a document management server. The document management server can be constructed both on a PC and as a file server shared and used by multiple users over a network.

Such an electronic information management system facilitates classifying or retrieval of documents. Further, a file server can also reduce a quantity of information efficiently by sharing the documents, and has a great advantage of using electronic information, such as enabling associating between the documents.

To the contrary, although the information storage by filing of a paper document is more intuitively comprehensible as described above than the information storage of an electronic document, it is very weak in retrieval or classifying, and the retrieval and classifying are the greatest shortcomings of the information storage by filing of paper documents.

As a way that solves such a defect, a method for reading a paper document by a scanner and storing it as an electronic document image in the same manner as an electronic document is implemented.

However, when such document images and electronic documents are continuously stored in an electronic information management system such as a document management server, its data capacity will increase explosively. Since limits are set on the storable capacity of the server, the server capacity needs to be expanded or the data capacity needs to be reduced by deleting a part of stored data.

The information stored in a document management server or the like contains various pieces of information, and the contents of the information are diversified as well. This information also includes a great deal of information that has a very important meaning only at a specific period and is necessary for only a specific person. For example, it includes the information that was needed only at the end of fiscal 2000 and the information valid for only a certain person. Most of this information becomes quite meaningless due to a lapse of a certain period or a change of circumstances.

It is undesirable from a data capacity viewpoint that the document image and electronic data that include meaningless (unnecessary/less important) information are stored.

If such meaningless information is stored, the meaningless information is also to be retrieved for information retrieval and the quality of a retrieval result will deteriorate. Specifically, if the information is retrieved under a certain condition, unnecessary information will also be displayed as a retrieval result in the state where it is mixed together with necessary information. The work of distinguishing and selecting truly necessary information from the unnecessary information will occur and an inconvenience will arise in the system utilization by the user.

Further, when a paper document that is kept ready to the user's hand becomes unnecessary, the paper document may be disposed of as garbage. At that time, if document data in which an electronic document that is an original copy of the paper document or the paper document is scanned is stored in a document management system, the document data needs also be deleted. However, in order to specify the data stored as a document image, it is necessary to understand the contents of the paper document that is at hand and set a condition under which the document is specified, thereby forcing the user to perform very troublesome work.

Moreover, since cellular phones and personal digital assistants that are increasing rapidly in recent years have a smaller storage capacity than that of a general PC when they store electronic information, such as electronic mail and image information, the electronic information needs to be rearranged. At this time, types of unnecessary information are extracted from the stored electronic information and the unnecessary information will be deleted. However, the user is at a loss for judgment as to whether it may be really deleted and the user may also delete necessary information by mistake. Due to such a problem, time is required for rearranging electronic information and the rearrangement itself becomes troublesome.

SUMMARY OF THE INVENTION

The present invention has been made in view of solving the problems noted above. That is, according to one aspect of the present invention, an electronic information management server has a feature extracting unit that extracts features of electronic information stored in a storing unit connected to a network, a deciding unit that decides whether the electronic information is to be deleted from the features extracted by the feature extracting unit based on an instruction from a client, and a deleting unit that deletes from the storing unit via the network the electronic information decided to be deleted by the deciding unit.

Further, according to another aspect of the present invention, the electronic information management server has a storing unit connected to a network that stores electronic information, a feature extracting unit that extracts features of the electronic information stored in the storing unit, a deciding unit that decides whether the electronic information is to be deleted from the features extracted by the feature extracting unit based on an instruction from a client, and a deleting unit that deletes from the storing unit the electronic information decided to be deleted by the deciding unit.

Furthermore, according to another aspect of the present invention, the electronic information management server has a storing unit connected to a network that stores electronic information, a feature extracting unit that extracts features of the electronic information stored in the storing unit, an instructing and operating unit that instructs the features of the electronic information, a deciding unit that decides whether the electronic information is to be deleted from the features extracted by the feature extracting unit based on an instruction from the instructing and operating unit, and a deleting unit that deletes from the storing unit the electronic information decided to be deleted by deciding unit.

Such an electronic information management server according to the present invention previously extracts features from the electronic information stored in a storing unit and decides whether the electronic information stored in the storing unit is to be deleted based on the features instructed by a client or the like. By deleting the electronic information to be deleted from the storing unit based on this decision result, the electronic information stored in the storing unit according to the instruction of the features can easily be detected and deleted.

Further, according to another aspect of the present invention, an electronic information management client instructs deletion of electronic information stored in a storing unit connected to a network, and has an instructing and operating unit that instructs features of the electronic information to be deleted.

Such an electronic information management client according to the present invention can easily specify and delete unnecessary electronic data that is stored in a storing unit connected to a network by instructing the features of the electronic information to be deleted by an instructing and operating unit.

Further, according to another aspect of the present invention, an electronic information management method has the steps of extracting features of electronic information stored in a storing unit connected to a network, deciding whether the electronic information is to be deleted from the previously extracted features based on an instruction from a client, and deleting from the storing unit via the network the electronic information decided to be deleted.

Furthermore, according to another aspect of the present invention, the electronic information management method has the steps of storing predetermined electronic information, extracting the features of the stored electronic information, deciding whether the electronic information is to be deleted from the previously extracted features based on an instruction from a client, and deleting the electronic information decided to be deleted.

Such electronic information management method according to the present invention previously extracts features from electronic information stored in a storing unit and decides whether the electronic information stored in the storing unit is to be deleted based on the features instructed by a client or the like. By deleting the electronic information to be deleted from the storing unit based on this decided result, the electronic information stored in the storing unit according to the instruction of the features can easily be detected and deleted.

Further, according to another aspect of the present invention, such an electronic information management method, when electronic information stored in a storing unit connected to a network is deleted, has the steps of inputting features of the electronic information to be deleted and giving a delete execution instruction to the electronic information to be deleted extracted by the storing unit according to the input features.

Such an electronic information management method according to the present invention can easily specify and delete unnecessary electronic information stored in the storing unit connected to a network by inputting the features of the electronic information to be deleted.

Further, according to another aspect of the present invention, the electronic information management method has the steps of inputting features of electronic information from terminal equipment and extracting electronic information to be deleted from the electronic information stored in the storing unit of the terminal equipment and deleting the electronic information extracted as a deletion object from the storing unit according to an instruction from the terminal equipment.

Furthermore, according to another aspect of the present invention, the electronic information management method has the steps of inputting features of electronic information from terminal equipment and extracting information to be deleted from the electronic information stored in the storing unit of the terminal equipment, transferring the electronic information extracted as a deletion object from the storing unit to a temporary storage server via a network according to an instruction from the terminal equipment and deleting the transferred electronic information from the storing unit.

Such an electronic information management method according to the present invention can easily specify and delete unnecessary electronic information stored in the storing unit by extracting information to be deleted from the information stored in a storing unit of the terminal equipment based on the features of the information input from terminal equipment, and deleting this extracted information according to an instruction. Further, when a deletion instruction is issued, although the extracted electronic information is transferred to a temporary storage server via a network and the unnecessary electronic information is deleted from the storing unit of the terminal equipment by deleting the information from the storing unit, the information is left in the temporary storage server. If the unnecessary electronic information is needed later or deletion is specified by mistake, it can be reread from the temporary storage server.

BRIEF DESCRIPTION OF THE DRAWINGS

Preferred embodiments of the present invention will be described in detail based on the followings, wherein.

DESCRIPTION OF PREFERRED EMBODIMENTS

Figure 1:
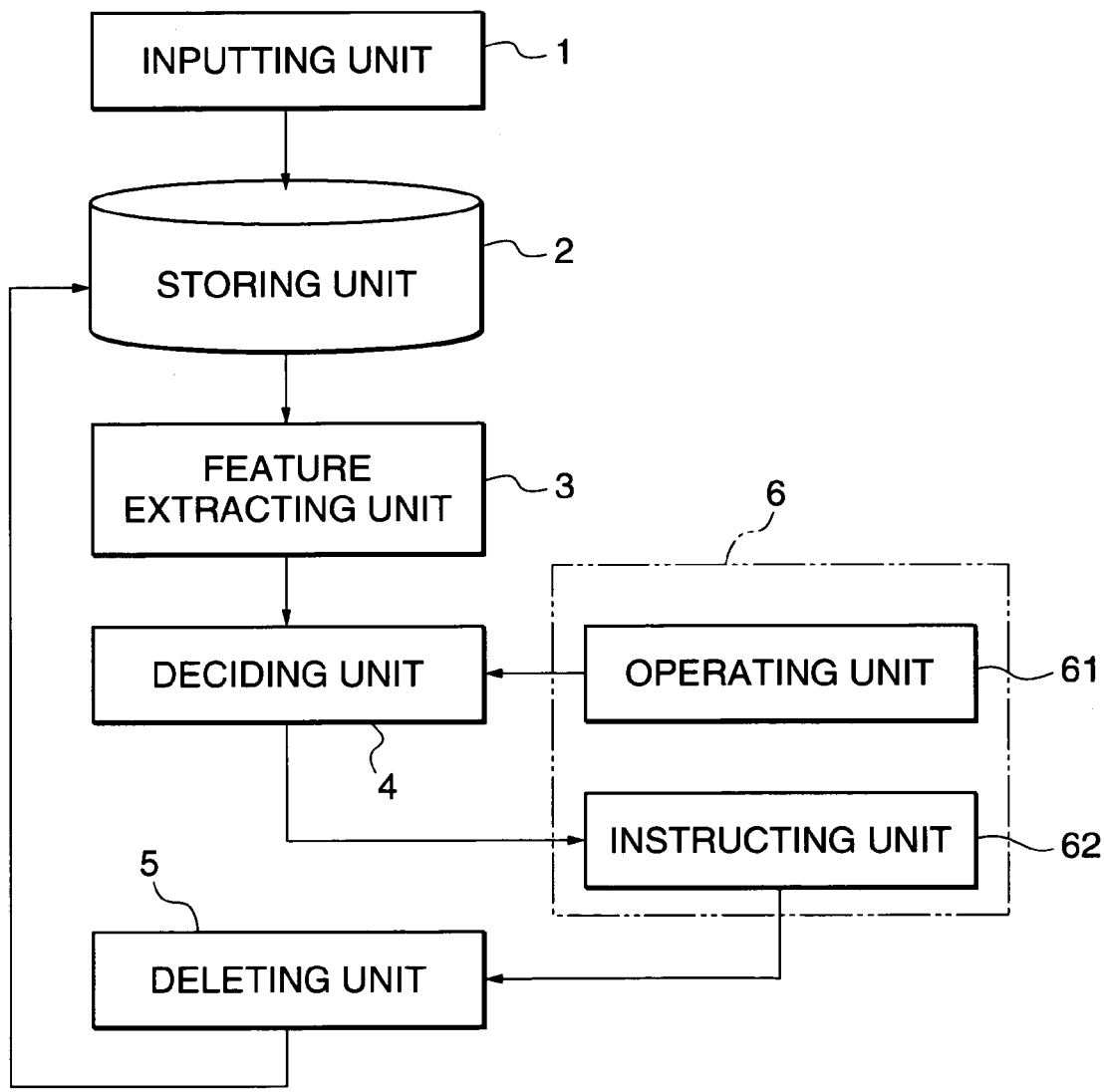
FIG. 1 is a block diagram for illustrating a system configuration of a first embodiment.
Figure 2:
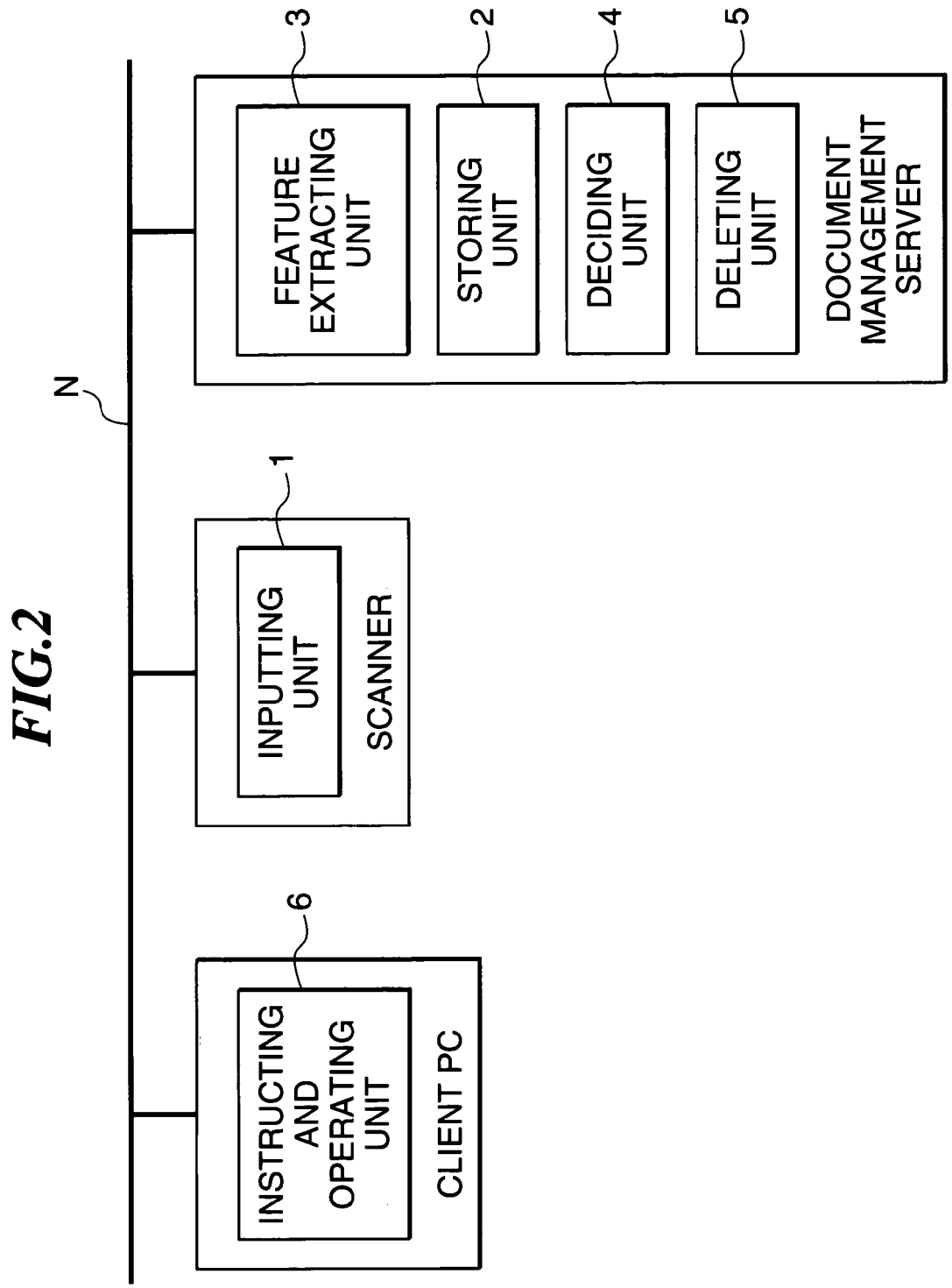
FIG. 2 is a block diagram for illustrating a configuration example (1) according to the first embodiment.

The embodiments according to the present invention are described below with reference to the drawings. FIG. 1 is a system block diagram for describing a first embodiment. This system (electronic information management system) has an inputting unit 1, a storing unit 2, a feature extracting unit 3, a deciding unit 4, a deleting unit 5, and an instructing and operating unit 6 provided with an operating unit 61 and an instructing unit 62, and is implemented by properly allotting these configurations to an electronic information management server and an electronic information management client.

The inputting unit 1 inputs document data. For example, a scanner is considered as a unit that inputs a paper document. Further, as a unit that inputs an electronic document, an apparatus that reads information from a medium in which the electronic document is stored, such as a floppy disc, a CD-ROM, and a magneto-optical disc and another PC and file sever connected via a network or a unit (network connection port) that receives the electronic document from a document management server are considered.

Hereupon, the paper document read by the scanner is converted to electronic data of a raster image format. This converted electronic data is stored in the storing unit 2 and is used for extracting features.

The storing unit 2 stores a document in the inner part of this system. It is implemented using a device such as a HDD (hard disk drive) and a memory. The electronic information, such as the document data fetched in the inner part of this system by the inputting unit 1 is stored in this storing unit 2. When the electronic information is stored, an index number and an identifier that specify the document and are not duplicate are assigned and also stored. The document data stored in the storing unit 2 can be called using this index number.

The feature extracting unit 3 extracts characteristic information from the document data stored in the storing unit 2. When document data is an electronic document, the internal data of the document data is analyzed and the characteristic information is extracted. The characteristic information of the electronic document includes the following items, for example.

Title of the document
Creation date of the document
Creator of the document
File name of the document
Application name under which the document is created
Document keyword
Full text of the document (whole document)

For the "document keyword" of feature information to be extracted, the full text of the contents of the electronic document is analyzed and the keyword is extracted. The method of extracting the keyword uses an existing one. For example, the method divides text in the unit of word, counts the occurrence frequencies of all words, and uses the words of higher occurrence frequencies as keywords.

Another method uses, as keywords, words highlighted in boldface type in text and words represented in larger sizes than other characters. Some electronic documents may contain none of the information described above. In that case, only the information that can be extracted is extracted.

When document data is the document image data in which a paper document is scanned, such types of characteristic information described above cannot directly be obtained. Therefore, such types of characteristic information as described above are obtained by performing OCR processing to the document image data and analyzing a character string obtained as a result of processing. This characteristic information is called a textual feature in this embodiment.

For the extracted textual features, the information is associated with the index number of the extracted document data and is stored in the storing unit 2.

The operating unit 61 is a user interface for allowing the user to operate this system. The user specifies a condition for specifying electronic information to be deleted using this operating unit 61.

For example, when a document created before a specific date must be specified and deleted, the "Creation date of the document" is selected as the condition to be specified and the date that becomes a standard of deletion is entered.

When document data created by a specific document creator must collectively be deleted, the "Creator of the document" is selected as the condition to be specified, and a name of the creator to be deleted or the number (employee number or the like) that specifies the creator is entered.

Further, when a document including a specific keyword must be deleted, the "Document keyword" is selected as the condition to be specified and the keyword is entered.

After the user specifies the condition of electronic information to be deleted, the user specifies deletion method conditions. There are mainly two types of deletion methods.

(1) The electronic information that matches the condition is deleted as it is.

(2) After the electronic information that matches the condition is checked, it is deleted.

For (1) of the deletion methods, the electronic information that matches the condition is deleted as it is. For example, when all documents before a fixed date are collectively deleted, the deletion method (1) is specified. Further, when there is the possibility of document data not to be deleted even in the documents before a certain date, the deletion method (2) that can specify that the documents are deleted or are not deleted for each document data is specified.

After the deletion methods are specified, the date when the delete processing is performed is specified. There are two specification methods of "one-shot processing" in which the delete processing is executed only once and "periodic processing" in which the same processing is periodically performed.

If the user selects the one-shot processing, the user specifies that either the delete processing is immediately executed or the delete processing is performed after a fixed period of time. If the user selects the periodic processing, the user specifies a periodic time condition, such as every how many hours, every how many days, or every what day of the week.

After the user specifies these deletion conditions, the user presses the processing execution button. When the button is pressed, the operating unit 61 instructs the start of decision processing to the deciding unit 4.

When the decision processing start is instructed from the operating unit 61, the deciding unit 4 judges whether electronic information is unnecessary based on the condition the user specifies and the characteristic information extracted by the feature extracting unit 3 (the characteristic information is associated with the index number of the electronic information and stored in the storing unit 2).

The deciding unit 4 compares the characteristic information extracted from all the electronic information stored in the storing unit 2 with the condition the user specifies for every piece of electronic information and decides whether the electronic information is to be deleted.

When the electronic information is not to be deleted, the deciding unit 4 does not perform any processing. On the other hand, when the electronic information is to be deleted, the "Deletion object data list" is created so as to make known that the electronic information is to be deleted, and the index number of the electronic information to be deleted is entered in the list.

When decision processing terminates to all electronic information, the "Deletion object data list" is sent to the deleting unit 5 if the specification of the deletion method is the deletion method (1) "Electronic information that matches the condition is deleted as is".

If the specification of the deletion method is the deletion method (2) "After electronic information that matches the condition is checked, it is deleted", the result of the "Deletion object data list" is sent to the instructing unit 62. The timing at which the "Deletion object data list" is sent is the date specified by the operating unit 61.

The instructing unit 62 displays a list of the electronic information to be deleted based on the "Deletion object data list" sent from the deciding unit 4. The user selects either the information that is not deleted or the information that is really deleted from the displayed electronic information list.

In selection, when the user must check the electronic information, the user selects the electronic information and presses the contents check button. When the button is pressed, the instructing unit 62 displays characteristic information such as creation date, creator, title, and keyword. If necessary, the instructing unit 62 displays the contents of electronic information.

After the user determines the electronic information to be deleted, the user presses the delete processing start button. When the button is pressed, the instructing unit 62 updates the "Deletion object data list" based on the result from which the user selects the information to be deleted or not to be deleted for each piece of electronic information. The instructing unit 62 sends the updated "Deletion object data list" to the deleting unit 5.

The deleting unit 5 receives the "Deletion object data list" and performs delete processing to the electronic information stored in the storing unit 2 based on the contents of the list. There are two methods of the delete processing. One is "Erase processing" that completely erases stored data and the other is "Hold processing" that adds a deletion mark to the electronic information, but will not actually delete the data.

Usually, the latter "Hold processing" is performed. Only when an instruction is given from the user, the "Erase processing" is performed. This is a measure for the case where deletion specification of data might have been made by mistake.

Further, for the "Hold processing", the capacity of the storing unit 2 will not be reduced. Accordingly, if the free space of the storing unit 2 is reduced, the user is urged to perform the "Erase processing". This system can also be set so as to perform the erase processing instead of urging the user to perform the erase processing.

In accordance with the condition the user specifies, such a system can quickly delete the electronic information that matches the condition and store only the information necessary for the user by securing free space of the storing unit 2 and deleting unnecessary information. Further, only the information useful for information retrieval is to be retrieved and the quality of a retrieval result can be improved.

Next, a specific configuration example is described. FIGS. 2 to 8 are block diagrams for describing various configuration examples. In the configuration example shown in FIG. 2, a document management server that is an electronic information management server, a scanner that is the inputting unit 1 to which a document is input and a client PC having the instructing and operating unit 6 are connected over a network N. In addition, multiple client PCs, scanners, and document management servers may be connected over the same network N.

The client PC is operated by the user. The instructing and operating unit 6 of the client PC can give an operation instruction to the document management server and the scanner via the network N.

The document management server has the feature extracting unit 3 of the electronic information of document data, storing unit 2 that stores and registers the electronic information and the features, deciding unit 4 that decides the electronic information to be deleted in accordance with the predetermined condition, and deleting unit 5 that deletes the electronic information decided to be deleted by the deciding unit 4 from the storing unit 2.

Figure 3:
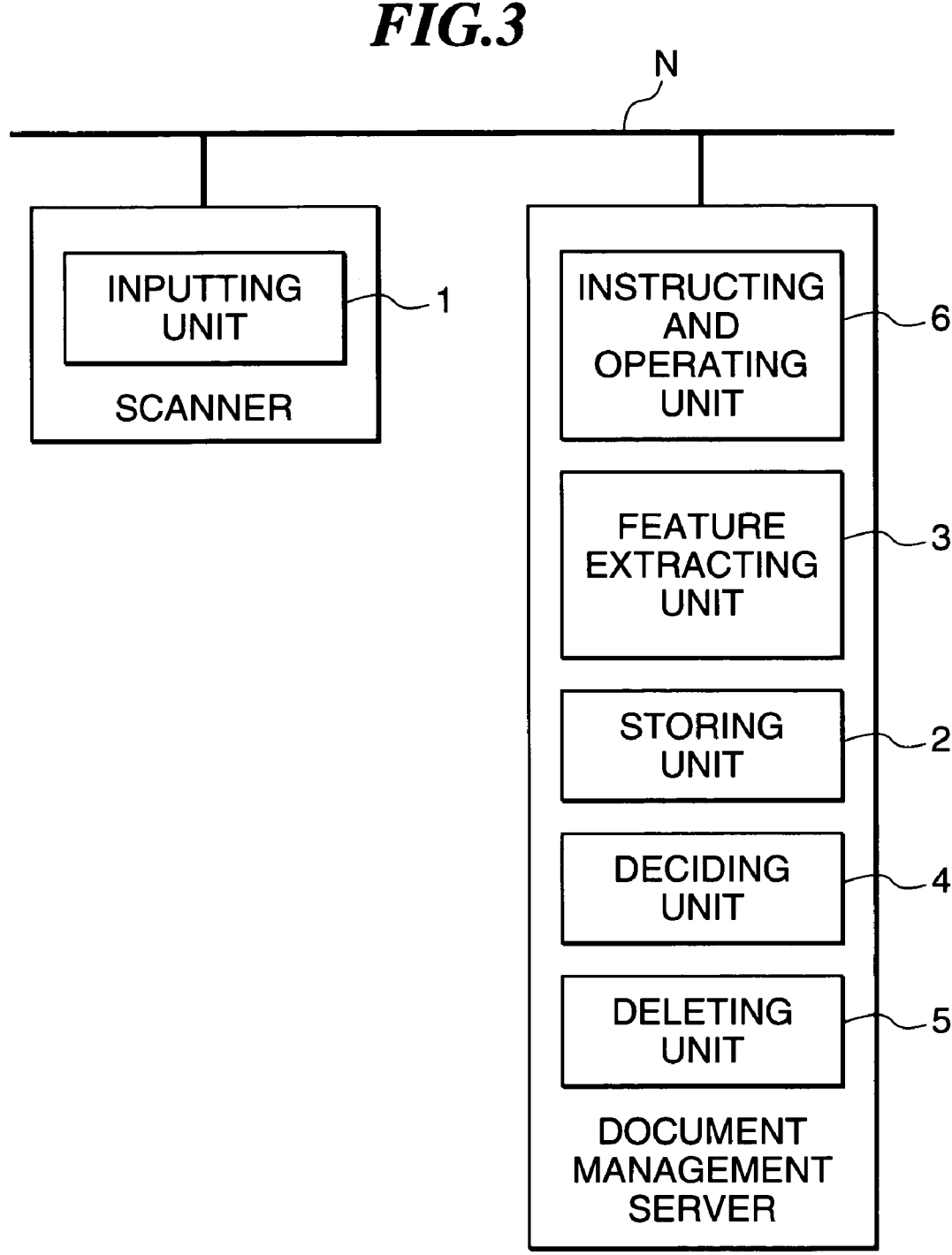
FIG. 3 is a block diagram for illustrating a configuration example (2) according to the first embodiment.

Further, when the client PC is not connected to the network N, the configuration as shown in FIG. 3 may be acceptable. That is, in the configuration, the document management server has the storing unit 2, feature extracting unit 3, deciding unit 4, deleting unit 5, and instructing and operating unit 6.

Figure 4:
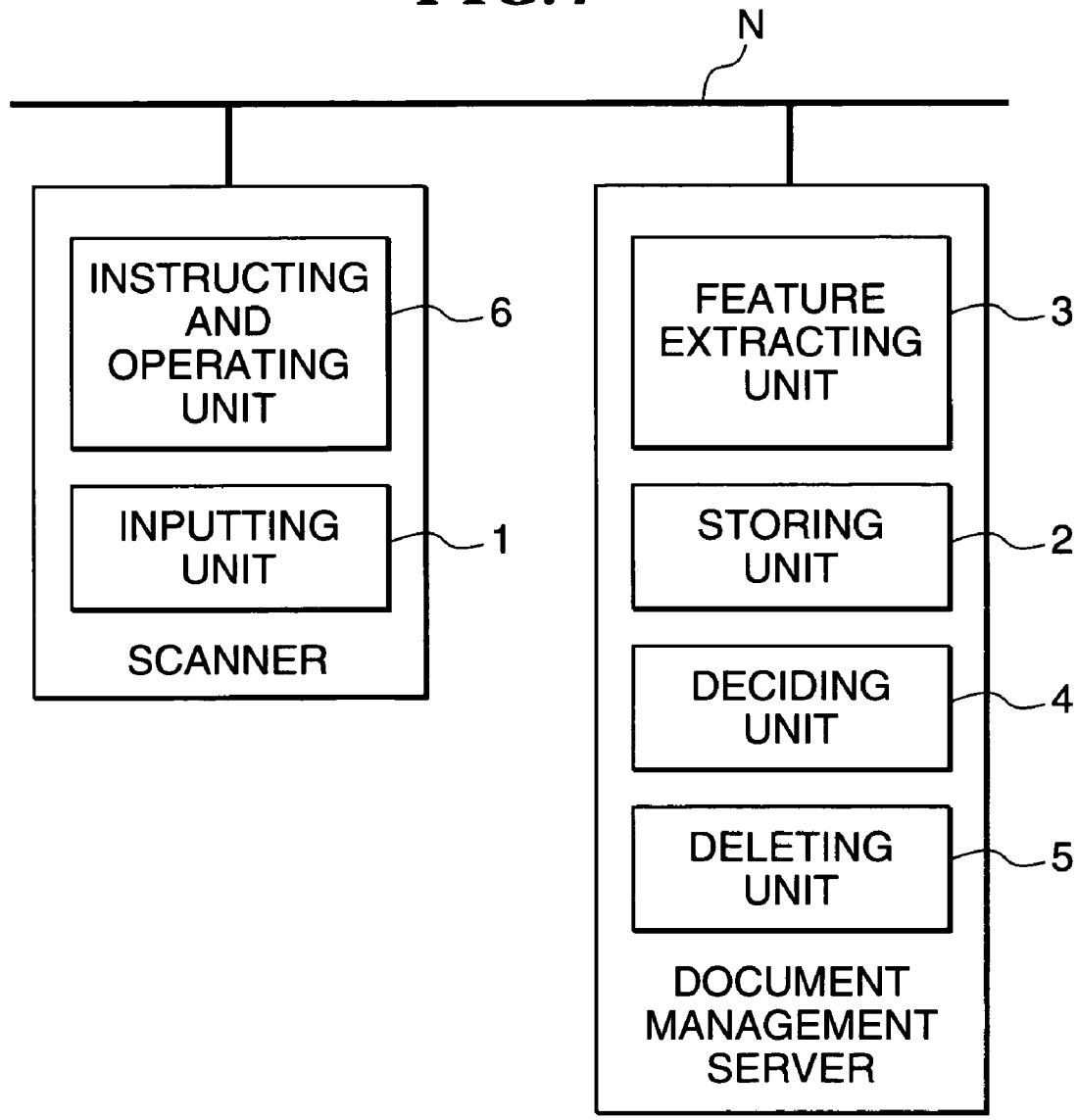
FIG. 4 is a block diagram for illustrating a configuration example (3) according to the first embodiment.

Similarly, when the client PC is not connected to the network N, the configuration as shown in FIG. 4 may also be acceptable. In this configuration, the document management server has the storing unit 2, feature extracting unit 3, deciding unit 4, and deleting unit 5, and the scanner has the inputting unit 1 and the instructing and operating unit 6.

Figure 5:
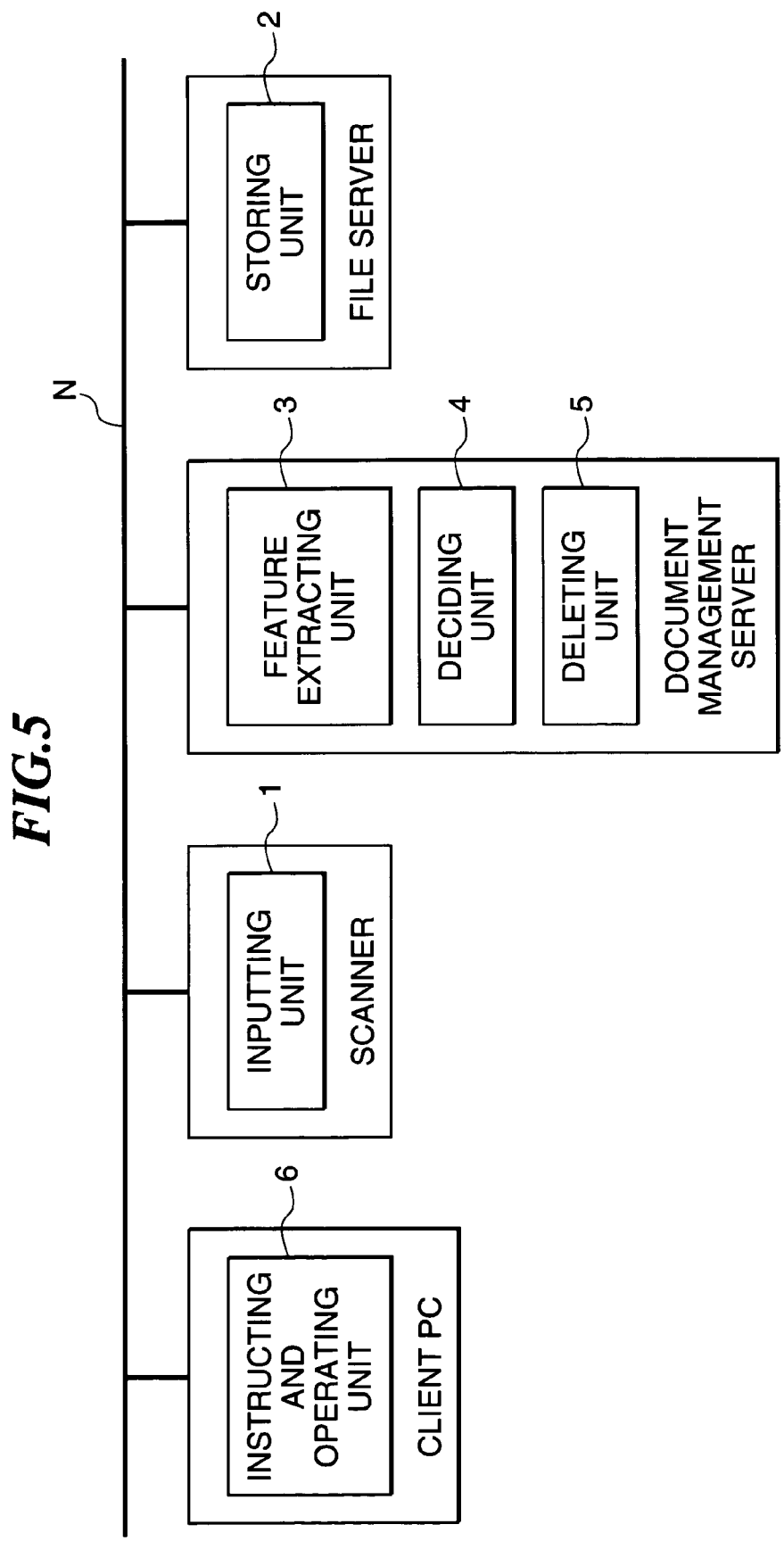
FIG. 5 is a block diagram for illustrating a configuration example (4) according to the first embodiment.

Further, in the configuration shown in FIG. 5, an example is given in which a file server is connected to the network N and the storing unit 2 is provided in this file server. In this case, the client PC has the instructing and operating unit 6 and the scanner has the inputting unit 1. The document management server has the feature extracting unit 3, deciding unit 4, and deleting unit 5.

Figure 6:
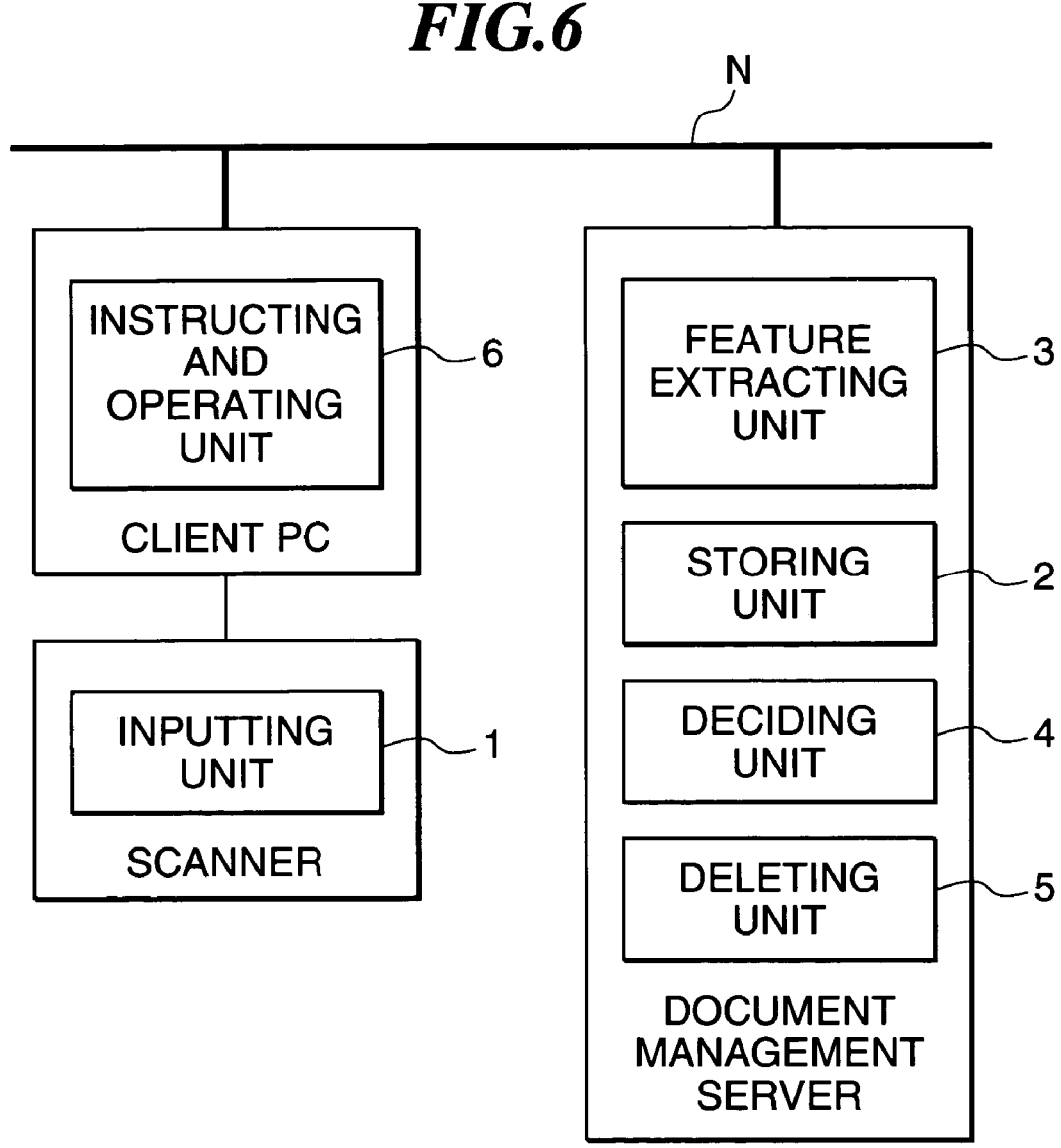
FIG. 6 is a block diagram for illustrating a configuration example (5) according to the first embodiment.

Further, like the configuration shown in FIG. 6, the scanner may also be connected to the client PC instead of being connected directly to the network.

Figure 7:
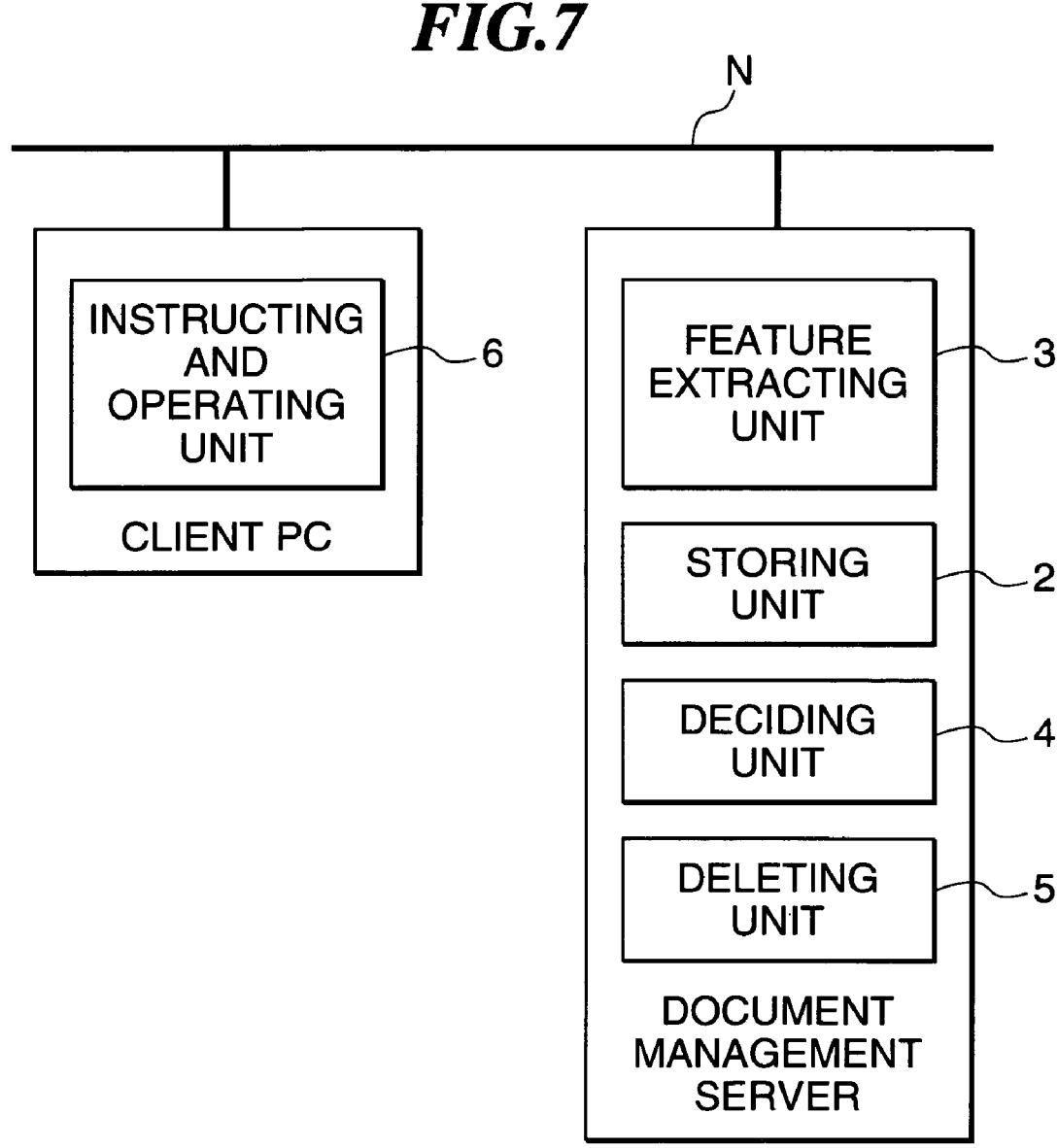
FIG. 7 is a block diagram for illustrating a configuration example (6) according to the first embodiment.

Furthermore, like the configuration shown in FIG. 7, when the document data to be registered is only an electronic document instead of a paper document, the configuration in which the client PC and the document management server are provided is acceptable.

Figure 8:
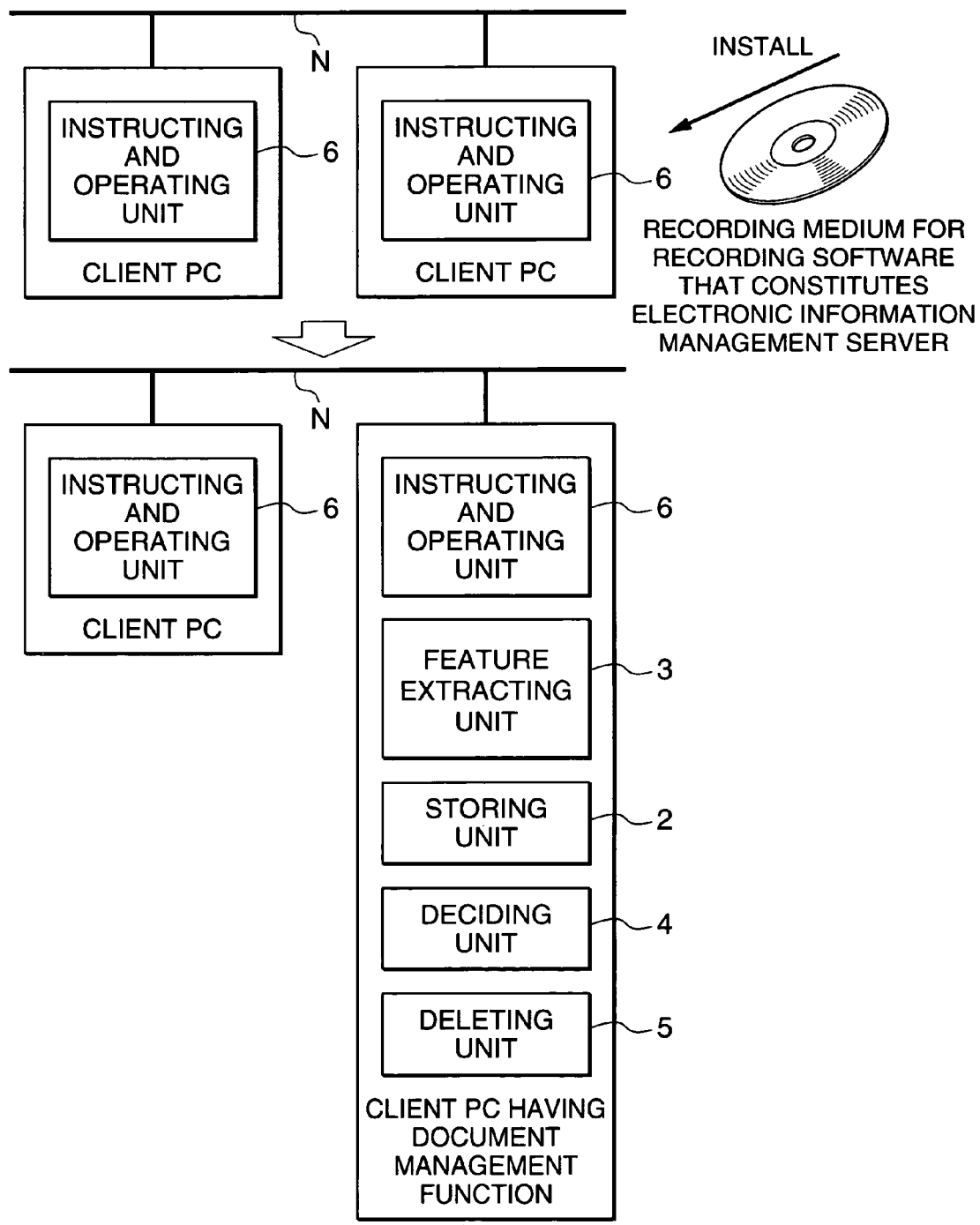
FIG. 8 is a block diagram for illustrating a configuration example (7) according to the first embodiment.

As shown in FIG. 8, the configuration in which only the client PC connected to the network N is provided may also be acceptable. In this case, the instructing and operating units 6 is also provided in all of the multiple client PCs. Then the electronic information management server is constructed by installing software that constitutes the electronic information management server of this embodiment in at least one of the client PCs from a medium such as a CD-ROM in which the software is stored.

Accordingly, the client PC in which a program is installed will function as the electronic information management server on which the instructing and operating unit 6, feature extracting unit 3, storing unit 2, deciding unit 4, and deleting unit 5 are provided.

Figure 9:
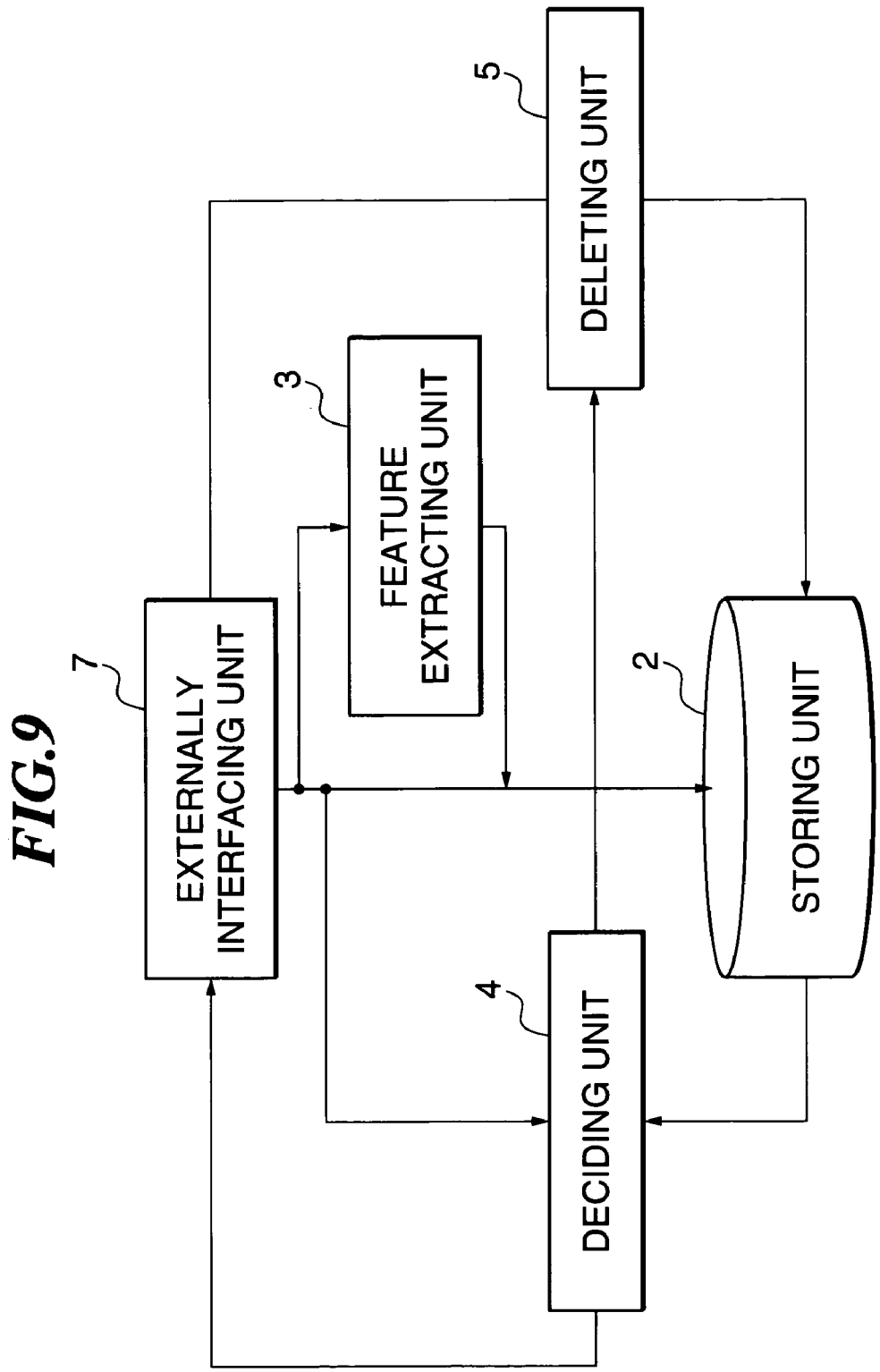
FIG. 9 is a block diagram for illustrating a configuration example of a document management server.

Next, a configuration example of the document management server is described with reference to FIG. 9. The main components of the document management server are a storing unit 2, a feature extracting unit 3, a deciding unit 4, a deleting unit 5, and an externally interfacing unit 7.

Among them, the storing unit 2, feature extracting unit 3, deciding unit 4, and deleting unit 5 are the same components as described previously. The externally interfacing unit 7 is a unit that sends and receives electronic information and operation instruction information to and from external equipment, such as connection with a network.

Figure 10:
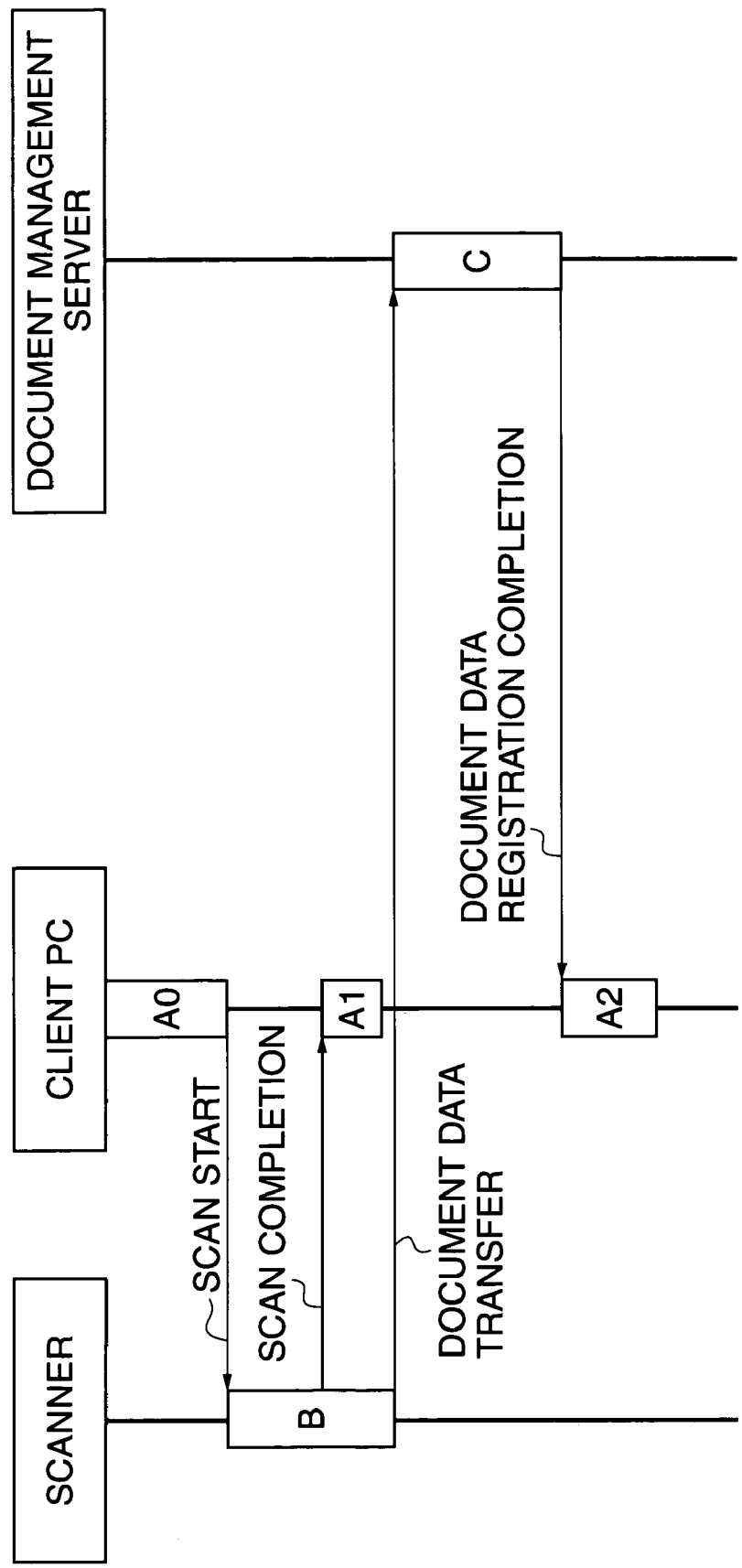
FIG. 10 is a diagram showing a flow of registration processing in the document management server.

The registration processing of the document data in such a document management server is described along the flow diagram of FIG. 10. First, after a paper document is set in the scanner, a scan start instruction is sent from the client PC to the scanner (A0).

Next, when the scanner receives the scan start instruction, it starts scanning the paper document. For the scan start instruction, the start button may also be pressed on the operator panel of the scanner. When the scanning is completed, the scanner sends a scan completion status signal to the client PC of the user. Subsequently, the document data obtained by scanning the paper document is sent to the document management server (B).

Then when the client PC receives the scan completion status signal, it outputs a scan completion message to the user (displays it on the screen). Since the output of this scan completion message is not always necessary, the scan completion status signal may be ignored (A1).

When the document management server receives document data, it registers the document data. When the document management server completes the registration of the document data, it sends a registration completion status signal to the client PC (C9).

When the client PC receives the registration completion status signal from the document management server, it outputs a registration completion message to the user (displays it on the screen). Since the output of this registration completion message is not always necessary, the registration completion status signal may be ignored (A2). The user operation on the client PC can also be performed from the operator panel (instructing and operating unit) of the document management server.

Figure 11:
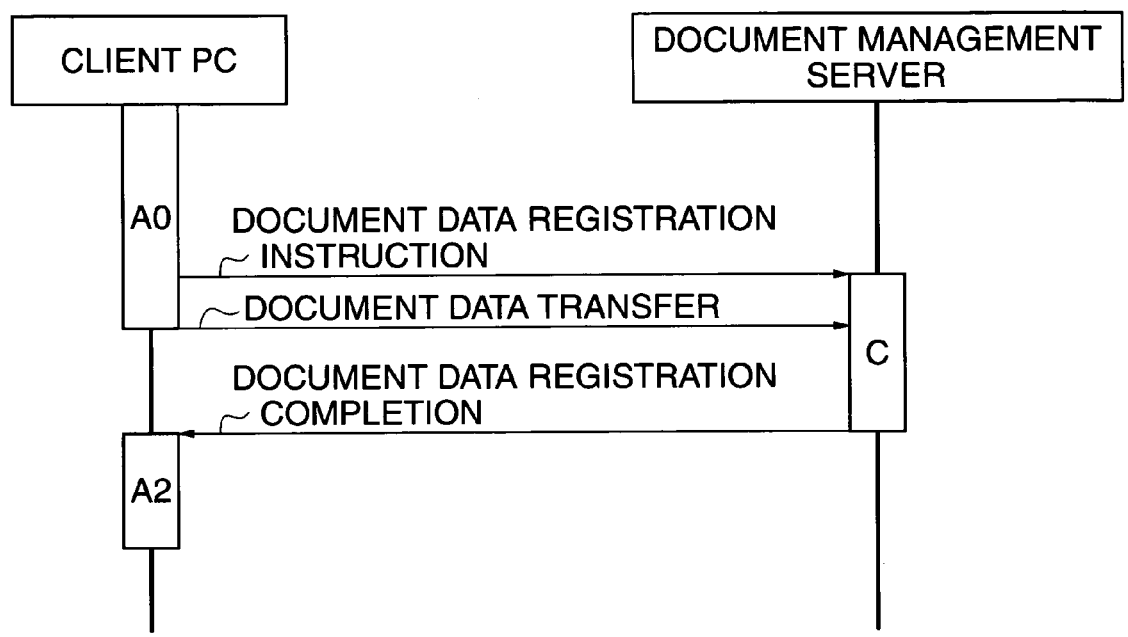
FIG. 11 is a diagram showing a flow when electronic information is stored in the document management server.

FIG. 11 is a flow diagram showing a flow when the electronic information of an electronic document format created using application software on the client PC is stored in the document management server. First, the electronic document on the client PC is specified and the registration processing of the electronic document to the document management server is started. Subsequently, the electronic document is transferred to the document management server (A0).

When the document management server receives electronic document, it performs processing in which the electronic document is registered in the storing unit. When the document management server completes the registration of the electronic document, it sends a registration completion status signal to the client PC (C).

When the client PC receives the registration completion status signal from the document management server, it outputs a registration completion message to the user (displays it on the screen). Since the output of this registration completion message is not always necessary, the registration completion status signal may be ignored (A2).

Further, when the scanner is directly connected to the client PC, since scanned data is directly created on the client PC, the same processing that registers the electronic document described herein to the document management server is performed. Further, the user operation on the client PC can also be performed from the operator panel (instructing and operating unit) of the document management server.

Figure 12:
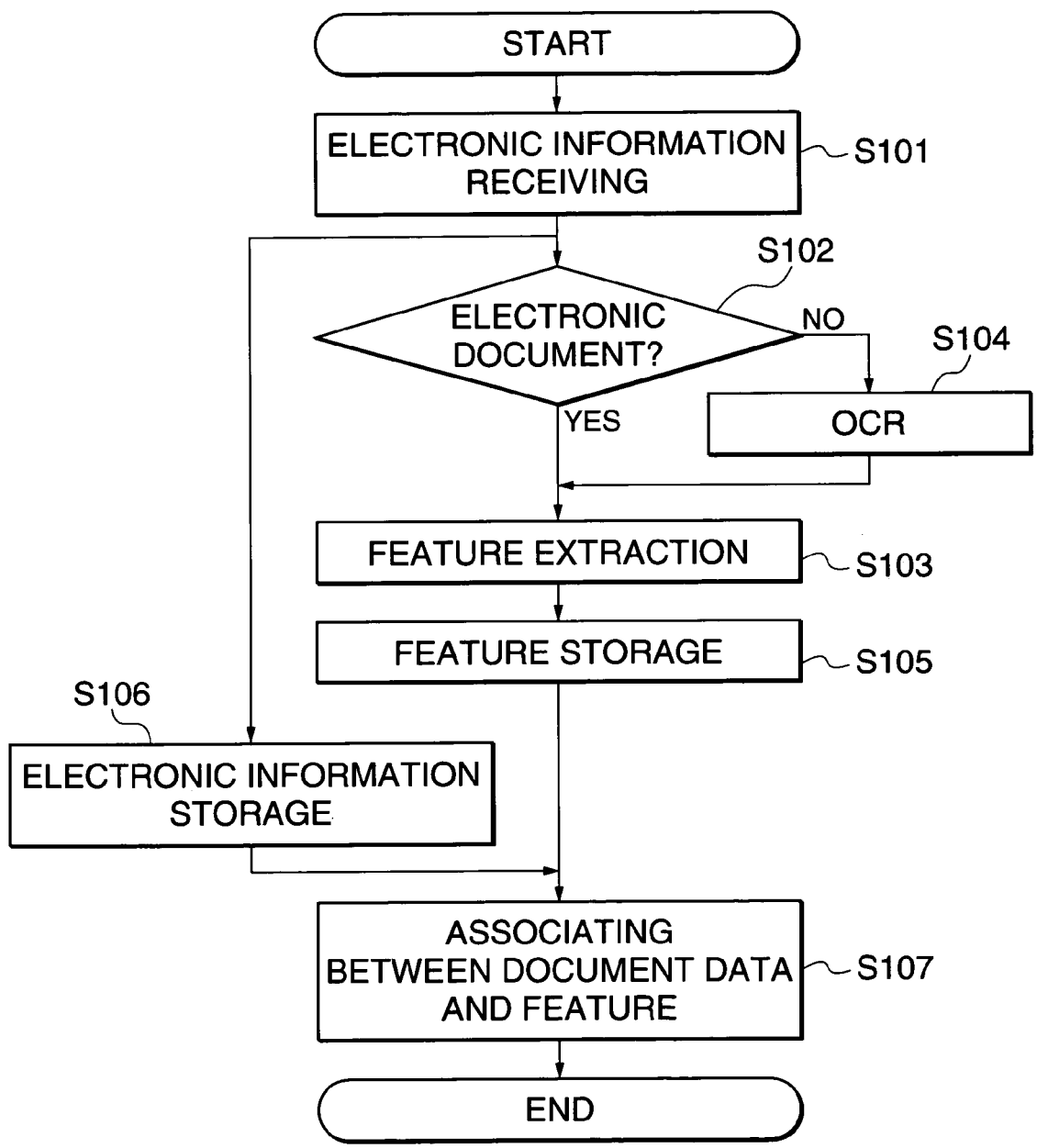
FIG. 12 is a flowchart for illustrating processing when the document management server stores the electronic information.

FIG. 12 is a flowchart for describing the processing when the document management server stores electronic information. First, when the document management server receives the electronic information (step S101), it judges whether the electronic information is the document data scanned from a paper document or an electronic document created using application software or the like (step S102).

For an electronic document, the electronic information is sent to the feature extracting unit and feature extraction processing is performed (step S103). On the other hand, for document data read by a scanner or the like, character recognition processing such as OCR is performed to the document data (step S104). The character recognition result is sent to the feature extracting unit and the feature extraction processing is performed (step S103).

In the feature extraction processing, features are extracted as described above. The extracted features are stored in the storing unit in feature storage processing (step S105). Further, the electronic information itself received by the document management server is also stored in the storing unit (step S106).

Subsequently, association processing is performed (step S107). In the association processing, an identifier that associates electronic information with the corresponding features is attached to identify which electronic information the extracted features are extracted from. Accordingly, the electronic information and the corresponding features are stored in the document management server.

Figure 13:
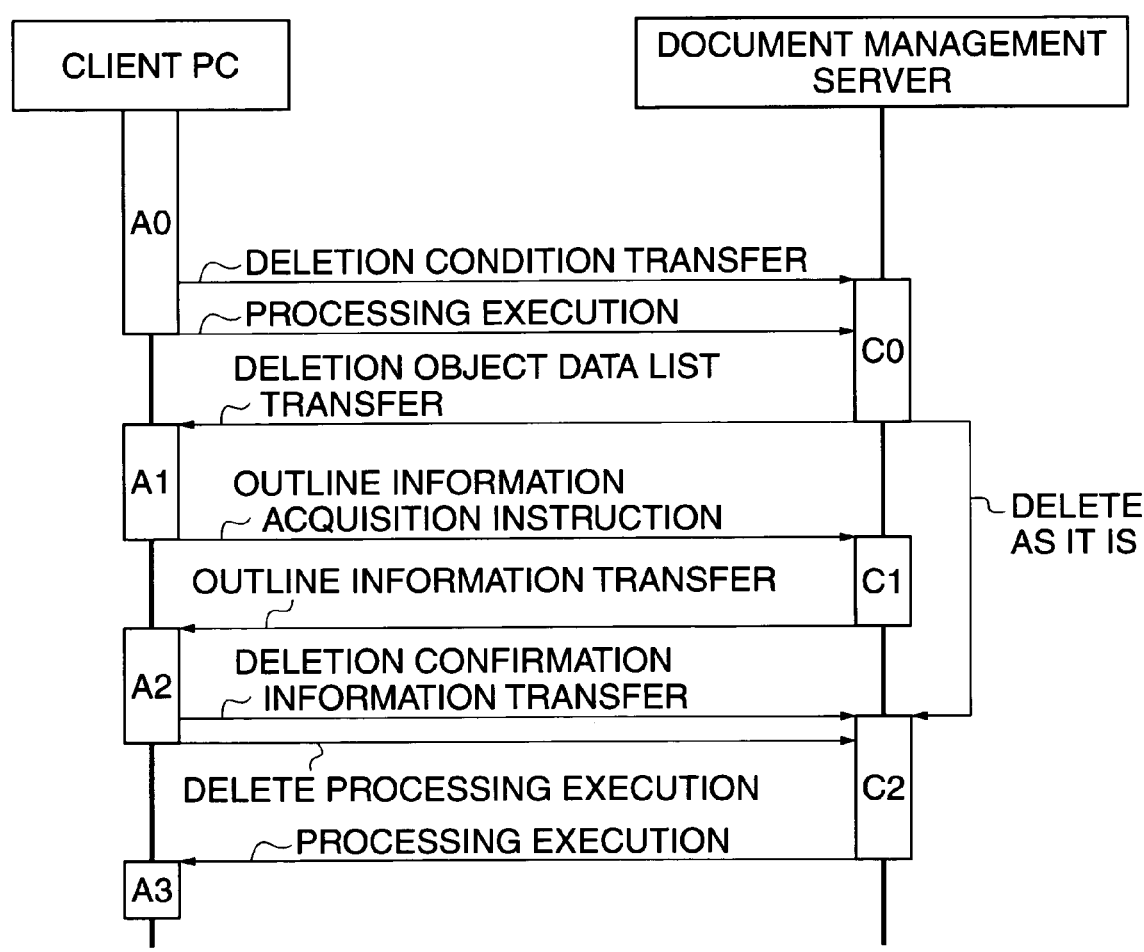
FIG. 13 is a diagram showing a flow of delete processing.

Next, delete processing is described along the flow diagram of FIG. 13. First, the user specifies the condition of the electronic information to be deleted by the operation of the client PC (A0).

Hereupon, when a document created before a specific date must be specified and deleted, the "Creation date of the document" is selected as the condition to be specified and the date that becomes a standard of deletion is entered.

When the document data created by a specific document creator must collectively be deleted, the "creator of the document" is selected as the condition to be specified and a name of a creator to be deleted and the number (employee number or the like) that specifies the creator is entered.

Further, when a document including a specific keyword must be deleted, the "Document keyword" is selected as the condition to be specified and the keyword is entered.

After the user specifies the condition of electronic information to be deleted, the user specifies deletion method conditions. As described above, there are two deletion methods: deletion method (1) the electronic information that matches the condition is deleted as it is; and deletion method (2) after the electronic information that matches the condition is checked, it is deleted.

After the deletion method is specified, the date on which the delete processing is performed is specified. There are two specification methods of "one-shot processing" in which the delete processing is executed only once and "periodic processing" in which the same processing is periodically performed.

When the user selects the single processing, the user specifies whether the delete processing is immediately executed or the delete processing is performed after a fixed period of time. When the user selects the periodic processing, the user specifies a periodic time condition, such as every what time, every what day, or every what day of the week. The specification order of the deletion conditions is not limited to that described here.

After the specification of these deletion methods is completed, the information about the deletion conditions is transferred from the client PC to the document management server. Then the user instructs processing execution to the document management server.

When the document management server receives the information about the deletion conditions and the instruction of processing execution from the client PC, it sends the deletion condition information and a decision processing start instruction to the deciding unit in the document management server. The deciding unit retrieves the electronic information having features that match decision condition information from the storing unit based on the received information. Subsequently, an index number attached to the electronic information of the retrieved result is written to the "Deletion object data list".

If the deletion method in the deletion conditions is "After the electronic information that matches the condition is checked, it is deleted", the "Deletion object data list" is transferred to the client PC when decision processing is completed. On the other hand, if the deletion method in the deletion conditions is "The electronic information that matches the conditions is deleted as is", processing jumps into the processing of C2 in FIG. 13.

When the client PC receives the "Deletion object data list" from the document management server, it outputs an outline of the electronic information in the list to the client PC (displays it on the screen) to check whether the electronic information of the list may be really deleted. Accordingly, first, an index number of the electronic information written in the list is read.

Since the contents of the information cannot be checked using only an index number, an outline information acquisition request of the electronic information is sent to the document management server to read from the document management server the electronic information that corresponds to the index number (A1).

When the document management server receives an instruction of the outline information acquisition request from the client PC, it fetches the outline information of the electronic information that corresponds to the index number and transfers it to the client PC (C1).

When the client PC acquires the outline information from the document management server, it lists the contents onto the client PC (displays them on the screen). The user selects the information that may really be deleted from this listed electronic information. In this case, the electronic information to be deleted may also be selected, and, to the contrary, the electronic information not to be deleted may also be selected.

When selection is completed, the index number of the electronic information that may really be deleted is transferred from the client PC to the document management server as deletion confirmation information. Subsequently, a delete processing execution instruction is sent from the client PC to the document management server (A2).

When the document management server receives the deletion confirmation information and the delete processing execution instruction from the client PC, it sends the deletion confirmation information to the deleting unit in the document management server as a deletion object data list (C2).

The deleting unit receives the deletion object data list and performs delete processing to the electronic information stored in the storing unit based on the contents of the list. When the delete processing is completed by the storing unit, the document management server sends a delete processing completion status signal to the client PC.

When the client PC receives the delete processing completion status signal from the document management server, it outputs a processing completion message to the user (displays it on the screen). Since the output of this delete processing completion message is not always necessary, the delete processing completion status signal may be ignored. Further, the user operation on a series of these client PCs can also be performed from the operator panel (instructing and operating unit) of the document management server.

Figure 14:
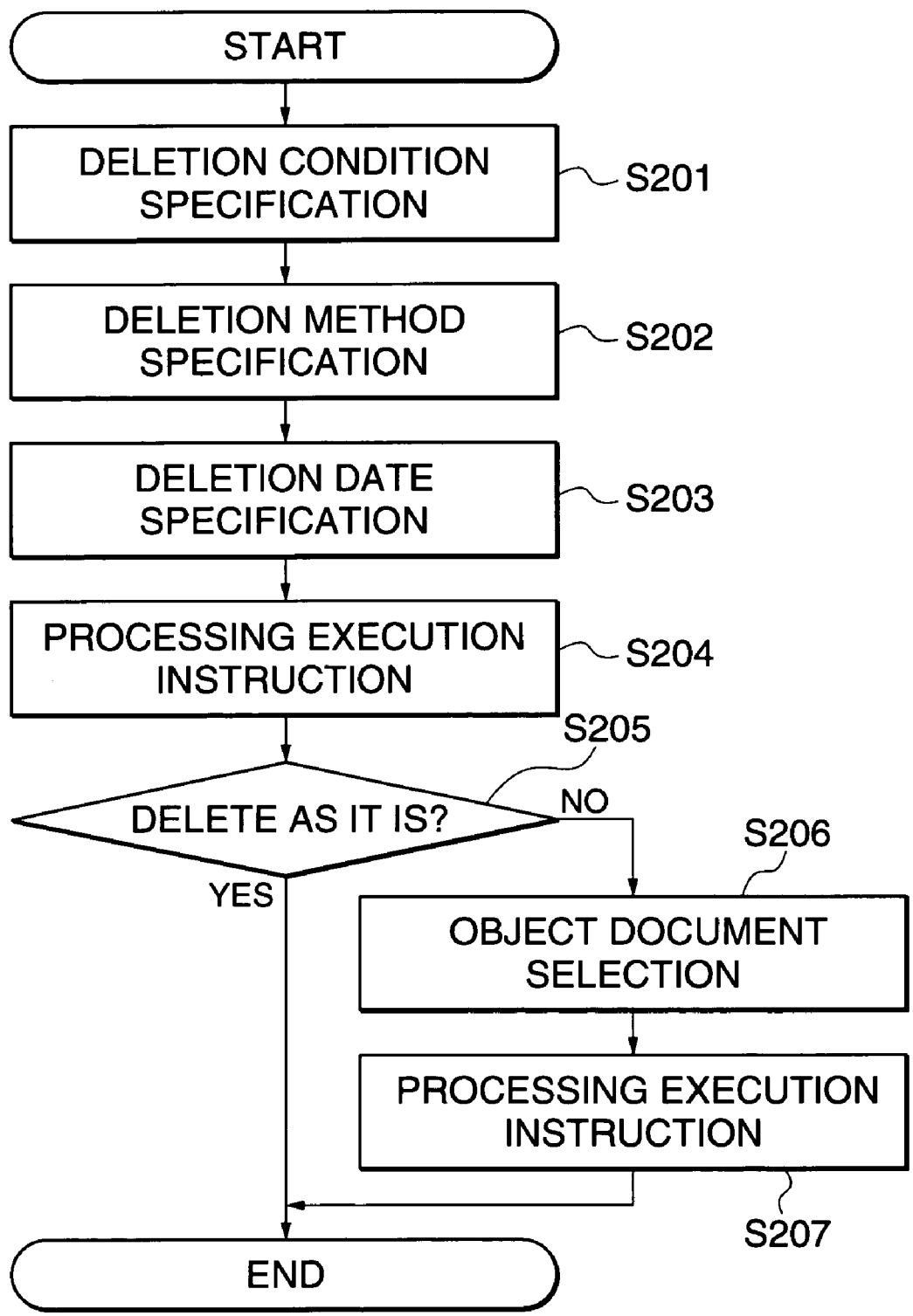
FIG. 14 is a flowchart for illustrating a flow of processing at a client PC side.

Next, a flow of processing at the client PC side when delete processing is performed is described along the flowchart of FIG. 14.

First, a deletion condition is specified by the instructing and operating unit of the client PC (step S201). As this deletion condition, as described previously, when a document created before a specific date must be specified and deleted, the "Creation date of the document" is selected as the condition to be specified and the date that becomes a standard of deletion is entered.

Further, when the document data created by a specific document creator must collectively be deleted, the "Creator of the document" is selected as the condition to be specified and a number of a creator and the number (employee number or the like) that specifies the creator is entered.

Furthermore, when a document including a specific keyword must be deleted, the "Document keyword" is selected as the condition to be specified and the keyword is entered.

Next, the user specifies deletion method conditions (step S202). As described above, there are mainly two kinds of deletion methods: deletion method (1) The electronic information that matches the condition is deleted as it is; and deletion method (2) After the electronic information that matches the condition is checked, it is deleted.

After the deletion methods are specified, the date when the delete processing is performed is specified (step S203). There are two specification methods of "one-shot processing" in which the delete processing is executed only once and "periodic processing" in which the same processing is periodically performed.

After these specifications are performed, the user sends a processing execution instruction from the client PC to the document management server (step S204).

When the client PC sends the processing execution instruction, the client PC judges whether "The electronic information that matches the condition is deleted as it is" is selected for the user-specified deletion condition (step S205), and when it is deleted as it is, the client PC has delete processing done by the document management server as it is.

On the other hand, when "After the electronic information that matches the condition is checked, it is deleted" is selected for the user-specified deletion condition, the deletion object data list transferred from the document management server is displayed and the selection of a deletion object document is performed (step S206).

Then after the deletion object document is selected, a processing execution instruction is sent to the document management server (step S207). Accordingly, only the selected electronic information is deleted from the storing unit.

As a result of such processing, in accordance with a condition the user specifies, the electronic information that matches the condition can automatically be deleted and only the information necessary for the user can be stored by securing the free space of the storing unit 2 and deleting unnecessary information. Only the information useful for information retrieval is to be retrieved and the quality of a retrieval result can be improved.

The delete processing on the client PC described above may also be implemented as the software having the program that corresponds to each step. That is, the delete processing function can be implemented using the client PC by installing this software in the client PC.

Next, a second embodiment of the present invention is described. In the second embodiment, the case where the paper document held by the user is to be deleted is used as an example. A document printed on paper is excellent in easiness of intuitive understanding and portability. In many cases, therefore, the document is created using PC application software and is printed on the paper.

When the document printed on this paper is discarded, the paper document may be disposed of as garbage. However, the electronic document data that is the source of the paper document and created using the application software will be left as it is without being discarded (deleted).

The second embodiment is characterized in that the original electronic document data is correctly deleted using the paper document as a deletion condition when the paper document is deleted.

Figure 15:
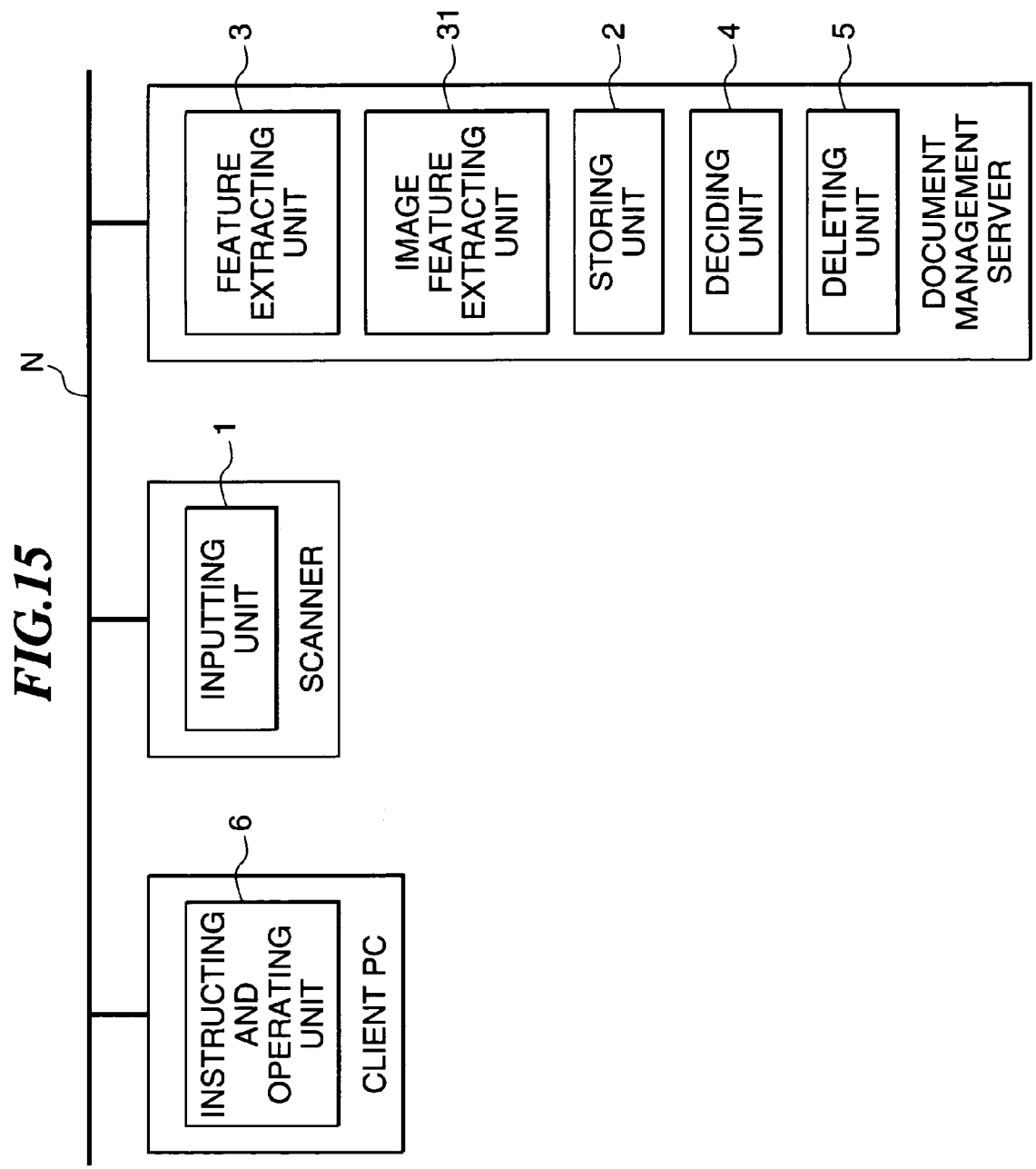
FIG. 15 is a block diagram for illustrating a system configuration of a second embodiment.

FIG. 15 is a system block diagram for describing the second embodiment. This system has the configuration in which the client PC, scanner, and document management server are respectively connected to the network N. Among them, the instructing and operating unit 6 is provided in the client PC and the inputting unit 1 is provided in the scanner. Further, the feature extracting unit 3, image feature extracting unit 31, storing unit 2, deciding unit 4, and deleting unit 5 are provided in the document management server.

Figure 16:
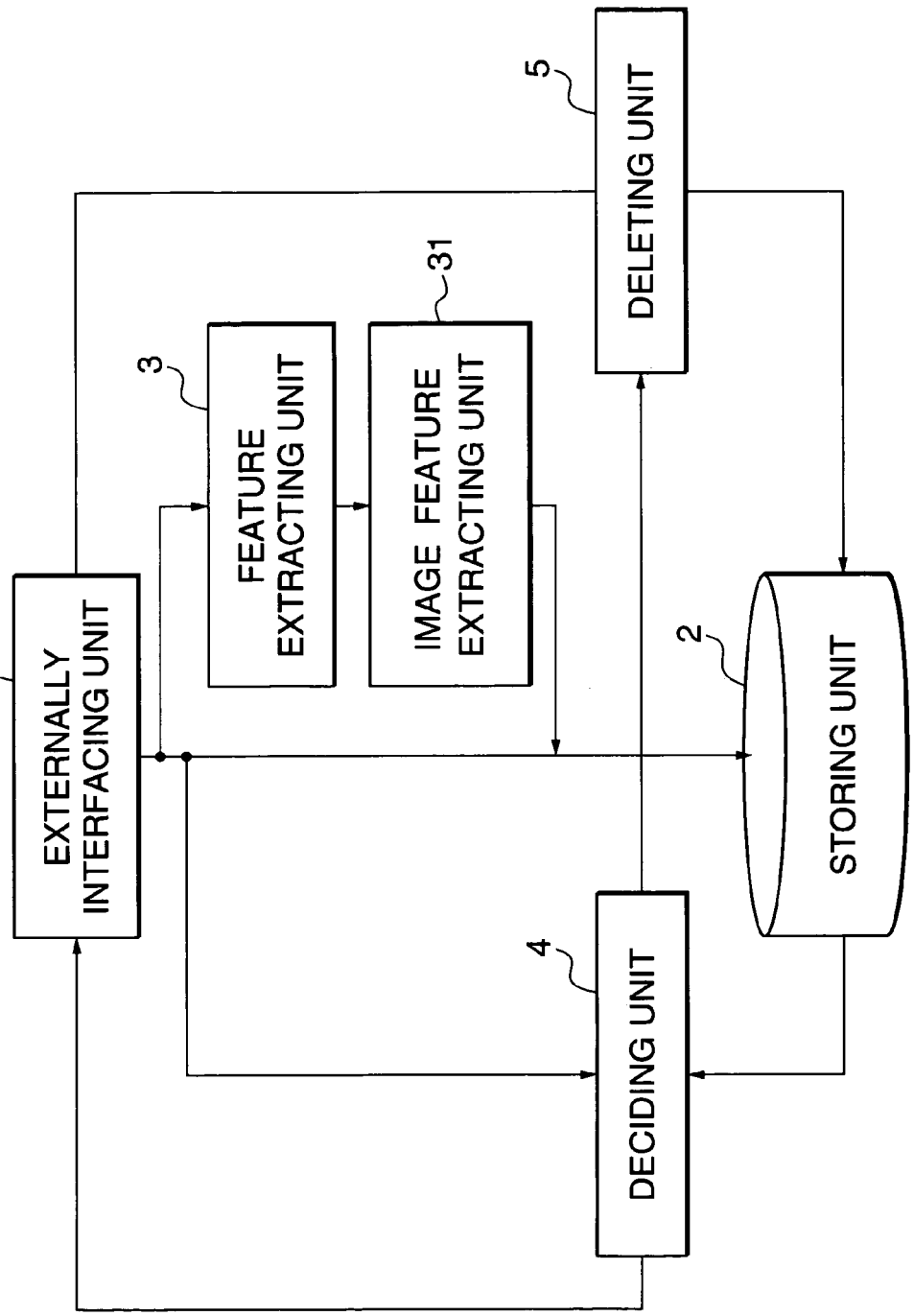
FIG. 16 is a block diagram showing the configuration example of the document management server applied to the second embodiment.

FIG. 16 is a block diagram showing a configuration example of the document management server applied in the second embodiment. The feature extracting unit 3 is the same unit as the first embodiment, and extracts characteristic information from document data or the like stored in the storing unit 2.

The image feature extracting unit 31 extracts image features. The image features are obtained by handling the page configuration of a document as an image and numerically calculates the aspect ratio of the image, the distribution of image colors or image brightness, and the distribution of image characters and line edges.

Figure 17:
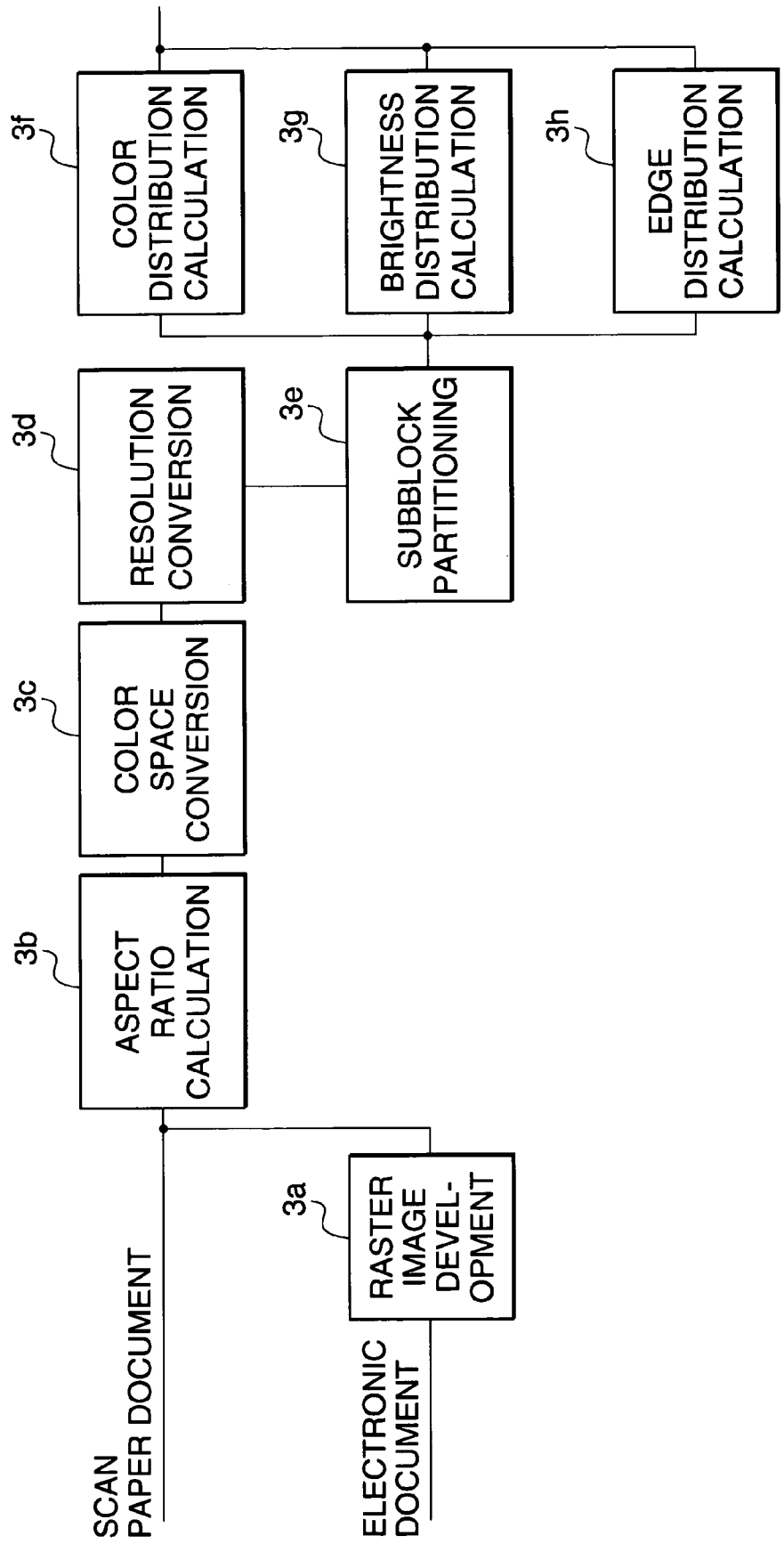
FIG. 17 is a view illustrating an extraction procedure of image features.

Hereupon, the extraction procedure of the image features by the image feature extracting unit 31 is described with reference to FIG. 17.

Raster image expansion 3a: when document data is an electronic document, image-specific information cannot be obtained as it is. Therefore, the electronic document is expanded as one raster image data item for each page and image features are extracted from the raster image data of the page. The electronic document into a raster image is expanded in the same method as a general laser printer. This function may also be mounted using software and using dedicated hardware for expanding the raster image. If the document data is scanned from a paper document, this processing is not necessary.

Aspect ratio calculation 3b: first, the aspect ratio of raster image data is calculated. For the aspect ratio, the number of vertical and horizontal pixels of the raster image data is calculated and the ratio of the number of vertical and horizontal pixels is considered to be aspect ratio.

Aspect ratio=(Number of vertical pixels of image)/(Number of horizontal elements of image)

Color space conversion 3c: next, the color space of raster image data is converted. The image data is represented by various and diversified color spaces, such as black and white, monochrome, RGB colors, YMCK colors, and YCbCr colors. If the color spaces used in this representation differ, the same image has a numerically different value. So the same color space needs to be used in order to compare the characteristics of an image color. Accordingly, the color space of the raster image data is converted to one color space. In this embodiment, the color space of the raster image data is converted to the RGB color space. It may also be converted to another color space. For example, L*a*b*, YCbCr, YUV, and YMCK are also acceptable.

Resolution conversion 3d: next, the resolution of the raster image data is converted. The raster image data has various sizes according to the resolution of the scanner when a paper document is scanned, the resolution when an electronic document is expanded into a raster image or the sizes (JIS-A4, A3 or the like) of the original document, and the directions (lengthwise and sidewise) of the document. Since it is difficult to uniformly compare the color distribution states of the raster image data of various sizes, the size of the raster image data needs to be standardized. Accordingly, in this embodiment, all raster image data sizes are converted to 1,000 pixels×1,000 pixels according to the resolution. Other sizes are also acceptable.

Figure 18:
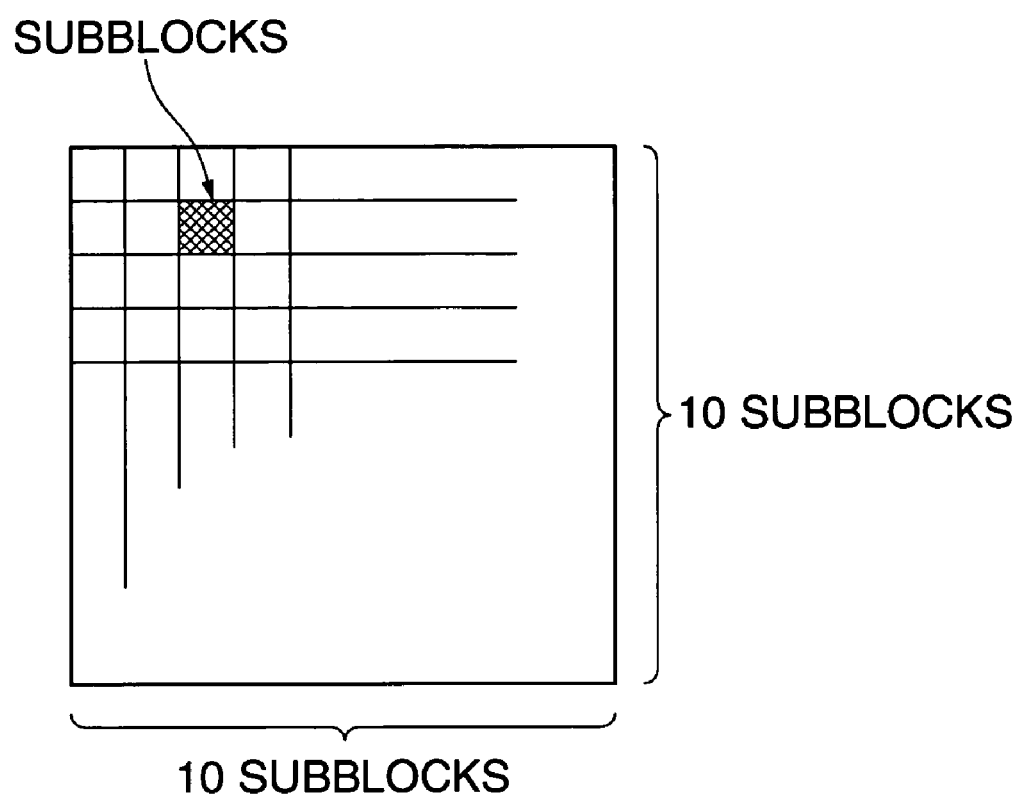
FIG. 18 is a view illustrating a concept of subblock partitioning.

Subblock partitioning 3e: next, the raster image data is partitioned into meshes having small blocks (subblocks). FIG. 18 shows a concept of the subblock partitioning.

Various numeric values are considered as the number of blocks to be partitioned. In this embodiment, a block is partitioned into 10×10=100 subblocks. The size of one subblock is 100 pixels×100 pixels. The image features are extracted every this subblock.

Color distribution calculation 3f: when the mean value of the colors of a subblock image is calculated, three RGB values are obtained from one subblock image. For example, as a result of color space conversion, when the image data is assumed to have converted to eight bits per pixel for the RGB respectively, the mean value of the colors of the subblock is a maximum of 255 and a minimum of 0 for the RGB respectively.

Since there are 10×10=100 subblocks, the information about the mean value of the colors of one raster image data item is 3×100=300 subblocks. The information about the mean value of the colors of these 300 subblocks is handled as a 300-dimensional vector. Since this 300-dimensional vector also includes the information about the subblock position, the 300-dimensional vector can be grasped as the color distribution information of the raster image data.

Brightness distribution calculation 3g: when the mean value of the brightness of a subblock image is calculated, one value is obtained from one subblock image. Similarly to the color distribution information described above, the brightness distribution information of the raster image data becomes a 10×10×1=100-dimensional vector. As specific values of the image brightness, there are luminance and lightness, for example.

Edge distribution extraction 3h: also for the edge distribution information of the raster image data, if edge information is extracted from a subblock image in the same manner, one value is obtained from one subblock image. Accordingly, the edge distribution information having a 10×10×1=100-dimensional vector is obtained.

In this embodiment, the aspect ratio (one-dimensional), color distribution information (300-dimensional), brightness distribution information (100-dimensional), and edge distribution information (100-dimensional) obtained above is called image features in all. The total of dimensional numbers of the image features produces a 501-dimensional vector.

Then the textual features extracted by the feature extracting unit 3 shown in FIG. 16 and the image features extracted by the image feature extracting unit 31 are put together. The information is associated with the index number of the extracted document data and is stored in the storing unit 2.

Since the storing unit 2, deciding unit 4, and deleting unit 5 are identical with those of the first embodiment, a detailed description is omitted here.

Next, the registration processing in the second embodiment is described. The registration processing in the second embodiment is basically identical with that of the first embodiment. However, a flow of the processing differs when the document management server stores document data.

Figure 19:
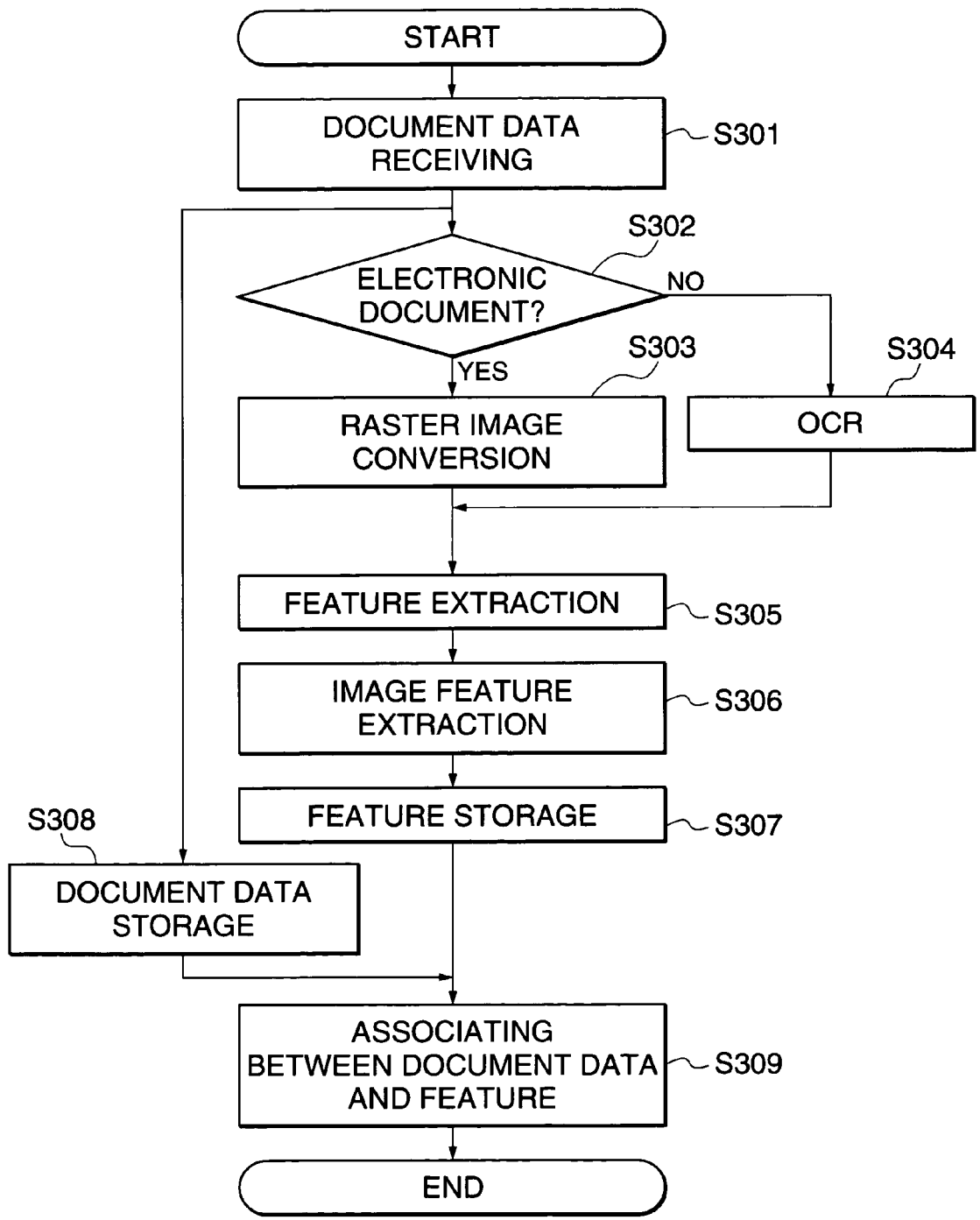
FIG. 19 is a flowchart for illustrating a flow of storing document data.

FIG. 19 is a flowchart for describing a flow when the document management server stores document data. First, when the document management server receives document data (step S301), it decides whether the document data is scanned from a paper document or is of an electronic document format created using application software or the like (step S302).

Hereupon, for the document data of the electronic document format, electronic document data is expanded into one raster image data item for each page (step S303). On the other hand, for the document data read by a scanner or the like, character recognition processing such as OCR is performed to the document data (step S304).

Subsequently, feature extraction processing is performed based on document data (step S305). In the feature extraction processing, the features described above are extracted. Subsequently, image feature extraction processing is performed (step S306). In the image feature extraction processing, image features, such as the aspect ratio, color distribution, color distribution, brightness distribution, or edge distribution, are extracted as described above.

The extracted textual features and the image features are stored in the storing unit together with document data (steps S307 and S308). Then in associating processing, an identifier that associates the document data with the features is attached in order to identify which document data the features are extracted from (step S309). With the above processing, registration processing into the document management server is completed.

Figure 20:
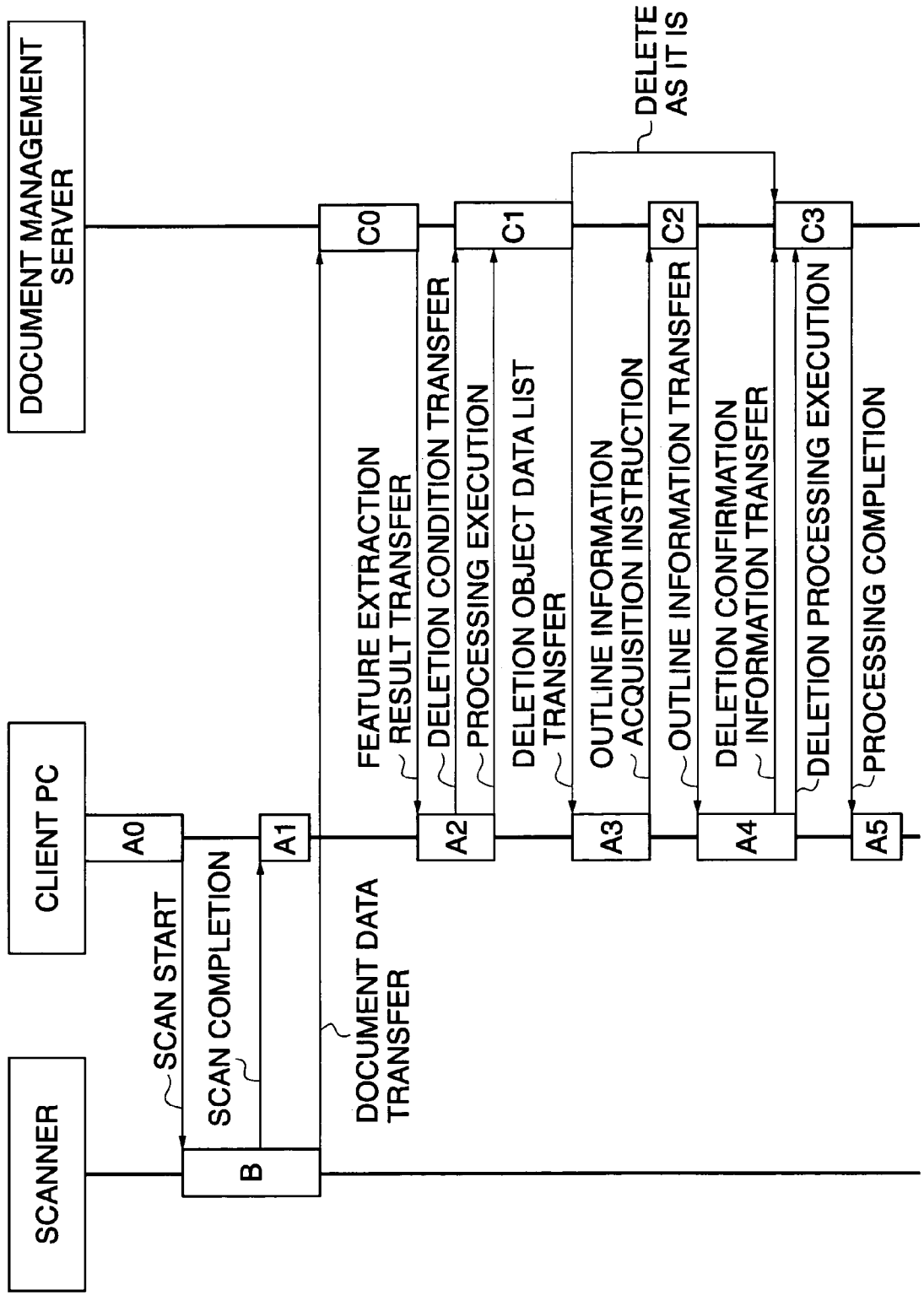
FIG. 20 is a diagram showing a flow of processing when a paper document is specified as a deletion condition.

Next, delete processing in the second embodiment is described. This delete processing can specify a paper document as the deletion condition. A flow of the processing when the paper document is specified as the deletion condition is described below along FIG. 20.

First, after the user loads the paper document to be deleted on the scanner, the client PC sends a scan start instruction to the scanner (A0). When the scanner receives the scan start instruction, it starts scanning the paper document. The scanner starts the scanning also when the scan start button on the operator panel of the scanner is pressed. When the scanning is completed, the scanner sends a scan completion status signal to the client PC of the user. Subsequently, the scanner sends the scanned document data to the document management server (B).

When the client PC receives the scan completion status signal, it outputs a scan completion message to the user (plays it on the screen). Since the output of this scan completion message is not always necessary, the scan completion status signal may be ignored (A1).

When the document management server receives document data from the scanner, it performs character recognition processing such as OCR to the document data and sends a character recognition result to the feature extracting unit. The feature extracting unit extracts textual features as described above. Further, the image feature extracting unit extracts image features, such as the aspect ratio, color distribution, brightness distribution, and edge distribution, as described above. Then the extracted textual features are transferred to the client PC. The image features are retained at the document management server side instead of being transferred (C0).

When the client PC receives textual feature data from the document management server, the contents of the features are output (displayed on the screen) (A2). In this embodiment, there are the following specification methods of a deletion condition.

(1) Specification is made so that the document data having the features output (displayed on the screen) will be deleted.

(2) A deletion condition is specified based on the data of the features output (displayed on the screen).

Hereupon, when specification is made so that the document data having the features output of (1) will be deleted, no other deletion condition is specified. On the other hand, when the deletion condition is specified based on the data of the features output of (2), the specification is identical with that of the deletion condition in the first embodiment.

Further, in the same manner as the first embodiment, deletion method conditions are specified as to whether they are deleted as they are or they are deleted after they are checked, and the date on which the delete processing is performed is specified. After the specification of these deletion conditions is completed, the client PC transfers deletion condition information to the document management server. The user instructs processing execution to the document management server.

When the document management server receives the deletion condition information and a processing execution instruction from the client PC, it sends the deletion condition information and the decision processing start instruction to the deciding unit in the document management server. The deciding unit retrieves the document data having the features that match the deletion condition information from the storing unit based on the received information.

When the deletion condition is "Specification is made so that the document data having features will be deleted", the document data is retrieved based on the image features retained in the document management server. For the document data stored in the storing unit, the image features are extracted when the data is registered, and these image features are associated with the document data in the same manner as the textual features and stored.

The image features have the 501-dimensional vector format as described previously. Further, the image features of the document data stored in the storing unit have also the 501-dimensional vector format. The deciding unit compares all the stored image features with a key image feature and calculates the degree of similarity for each image feature.

There are various calculation methods of the degree of similarity of the image features. In this embodiment, the degree of similarity is calculated according to the following method. That is, since the image features have the 501-dimensional vector format, the distance of the two vectors between the vector of the key image feature and the vector of the stored image features and a distance value are used as the degree of similarity. As this distance is short, it indicates that the two vectors are close to each other and the two vectors are similar.

The deciding unit calculates several high-order index numbers of document data having vectors of which the degree of similarity is high (short distance value). When the deletion condition is "The deletion condition is specified based on the data of the features", the document data having the features that match the deletion condition information is retrieved from the storing unit in the same manner as the decision processing of the first embodiment. Subsequently, the index number of the document data of the retrieval result is written to the "Deletion object data list".

When the deletion method in the deletion condition is "After the matched document is checked, it is deleted", the "Deletion object data list" is transferred to the client PC when decision processing is completed (C1). When the deletion method in the deletion condition is "The document that matches the condition is deleted as it is", processing jumps to the processing of C3.

The processing of A3 to A5 or C2 to C3 is identical with that of the first embodiment. This user operation on a series of client PCs can also be performed from the operator panel of the document management server.

As a result of the above processing, in this embodiment, when the paper document the user is holding is used as a deletion condition, the document data that matches this condition can automatically be deleted, and only the information necessary for the user can be stored by securing the free space of the storing unit and deleting unnecessary information. Further, only the information useful for information retrieval is to be retrieved and the quality of the retrieval result can be improved.

Next, a third embodiment of the present invention is described. In the third embodiment, the condition of the "Batch deletion of a related document" can be specified when a condition of the document data to be deleted is specified.

The related documents handled in this embodiment are as follows:

(Simultaneously Input Paper Document)

If a paper document has multiple pages when the paper document is input using an image inputting unit, such as a scanner, the series of paper documents are to be related documents. Further, simultaneously input document data may also be used as the related documents.

(Document Data Related to Contents)

Further, when document data is registered and stored in the document management server, the document management server judges the description contents of the document data, retrieves other document data related to the document data, and automatically specifies it as a related document based on the retrieval result. The user can also specify multiple document data items that construct the related document.

The document data that is a related document is stored in the storing unit by attaching an identifier indicating the related document when it is stored in the document management server.

In the document management system of this embodiment, when the condition of "batch deletion of a related document" is specified by the operating unit when the registered is deleted, the deciding unit checks whether the related document information is added to each document data item contained in the "Deletion object data list" created according to the method described in the first embodiment.

If the document data to which related document information is added is found in the list, all related documents are added to the deletion object data list referring to the related document information. Tag information that indicates whether the document is a related document is added to the list and whether the document is the related document is instructed to the user.

According to such an embodiment, not only document data that matches the specified condition but also other document data related to the document data are extracted to be deleted and the document data can efficiently be deleted.

Next, a fourth embodiment of the present invention is described. The fourth embodiment is characterized in that the user stores the data deleted from the document management server into another server.

That is, in this embodiment, when a deletion instruction of the document data the user holds is issued, the document data is fetched from the document management server and stored in a device (temporary storage server) for storing document data separate from the document management server of the user.

This is used to recover temporarily stored document data on the document management server of the user when the user requests that the document data once deleted must be recovered.

Figure 21:
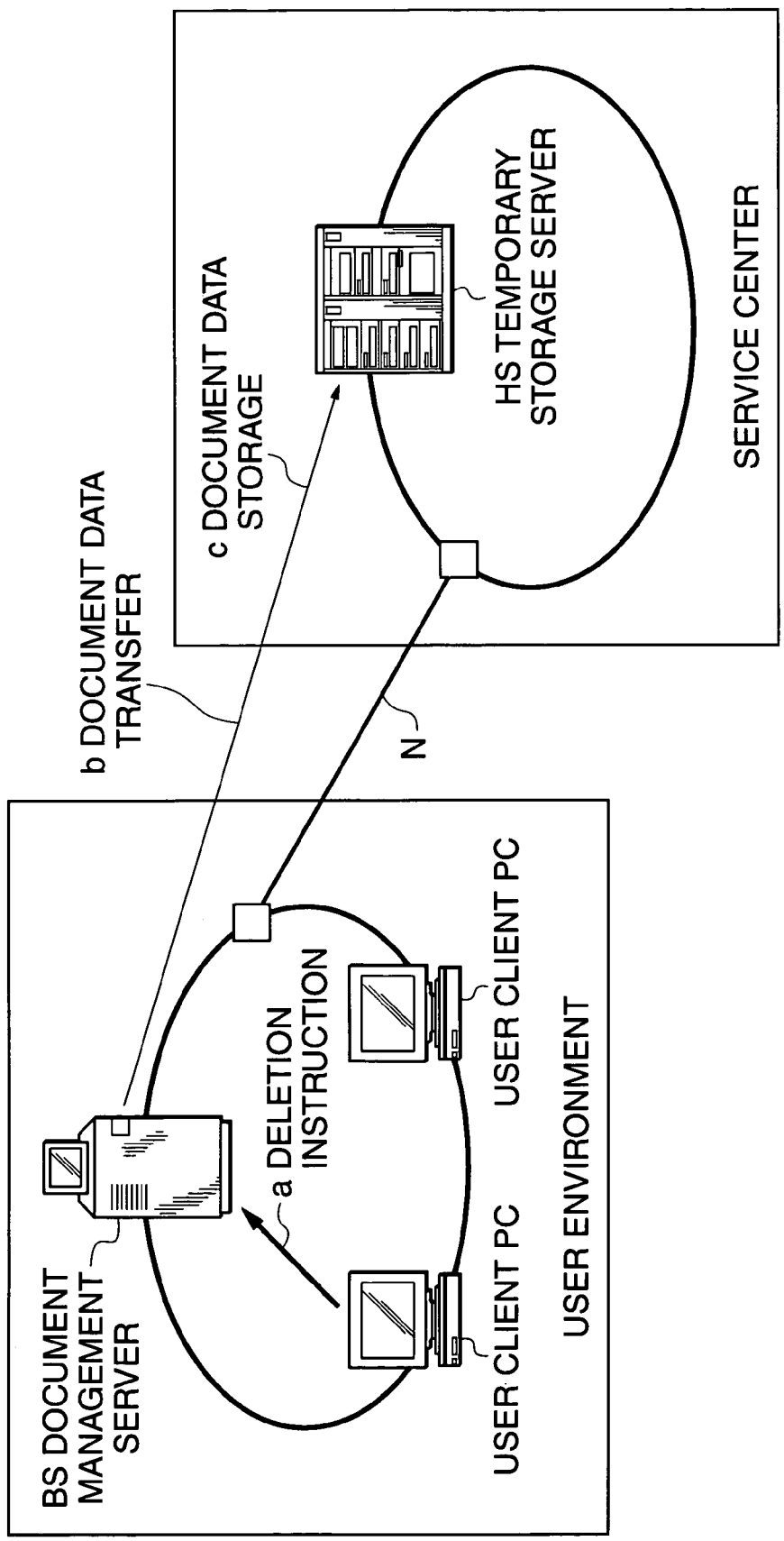
FIG. 21 is a block diagram for illustrating a system configuration of a fourth embodiment.

FIG. 21 is a system block diagram for describing this embodiment. A temporary storage server HS is installed in the service center or the like where a company that sells and maintains document management servers BS installs one of its document management servers BS. At this time, the document management server BS and the temporary storage server HS installed in the user environment need to be connected to the network N.

In addition, the temporary storage server HS may also be installed in the user's network environment. Further, since the function of the temporary storage server HS can also be mounted using software, a function equivalent to the temporary storage server HS can be implemented by installing the software on which the function of this temporary storage server is mounted in the client PC or the like connected to the user network environment.

Figure 22:
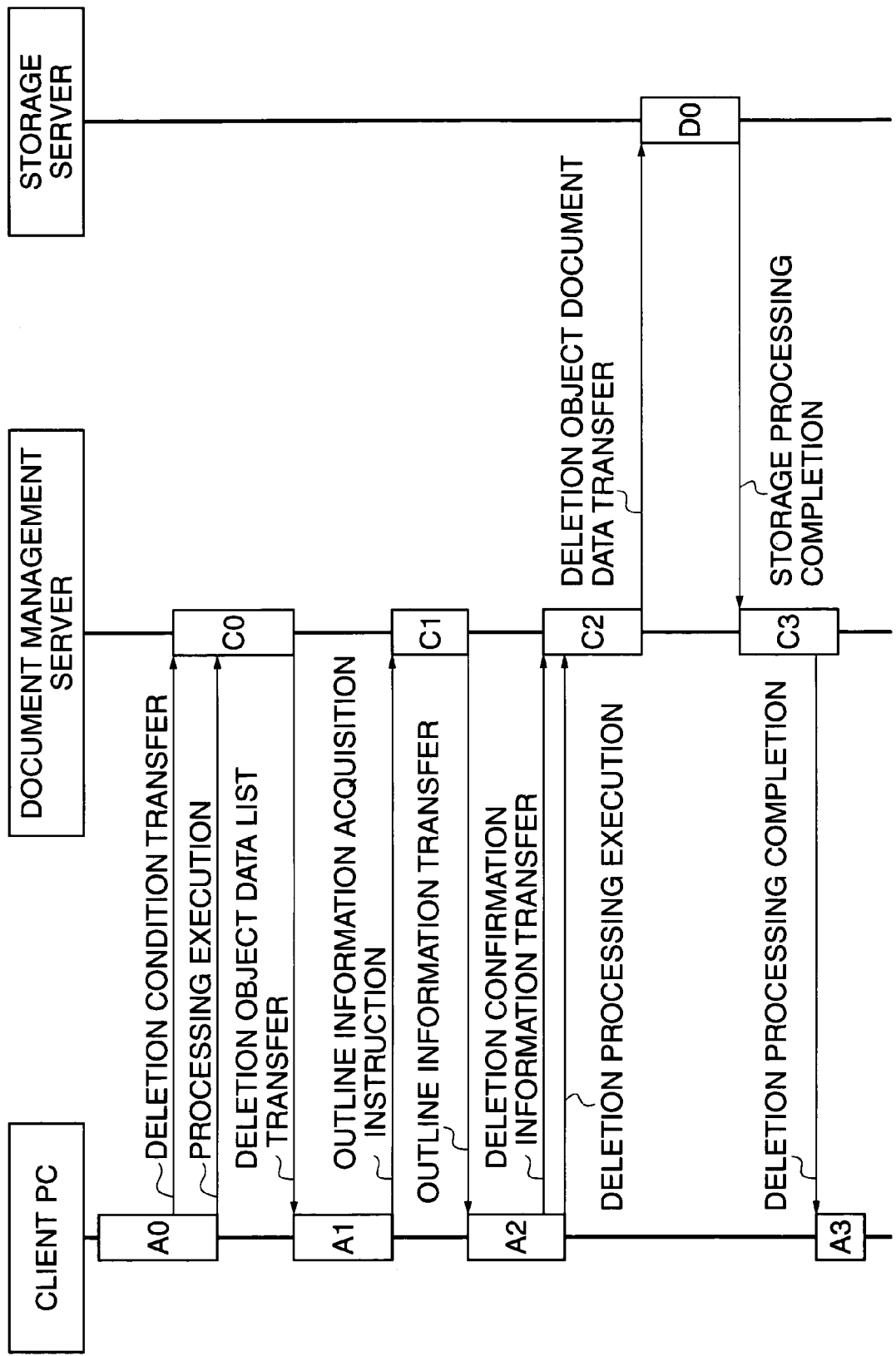
FIG. 22 is a diagram showing a flow of delete processing in the system of the fourth embodiment.

FIG. 22 is a flowchart showing a flow of the delete processing in the system of this embodiment. When viewed from the client PC side of the user, the delete processing of the present embodiment is the same as the delete processing described in the first embodiment.

The difference is that after the document management server receives a delete processing execution instruction from the client PC, document data is really deleted for the first embodiment, but, in this embodiment, the document to be deleted is transferred to the temporary storage server separate from the document management server instead of deleting the document data to be deleted.

When the temporary storage server receives document data to be deleted, the document data is stored by attaching an identification number to it and stored. When storage is completed, the temporary storage server sends a storage processing completion status signal to the document management server (D0).

When the document management server receives the storage processing completion status signal, it sends a delete processing completion status signal to the client PC (C2).

When the client PC receives the delete processing completion status signal from the document management server, it outputs a processing completion message to the user (displays it on the screen) (A3). Since the output of this delete processing completion message is not always necessary, the delete processing completion status signal may also be ignored.

Figure 23:
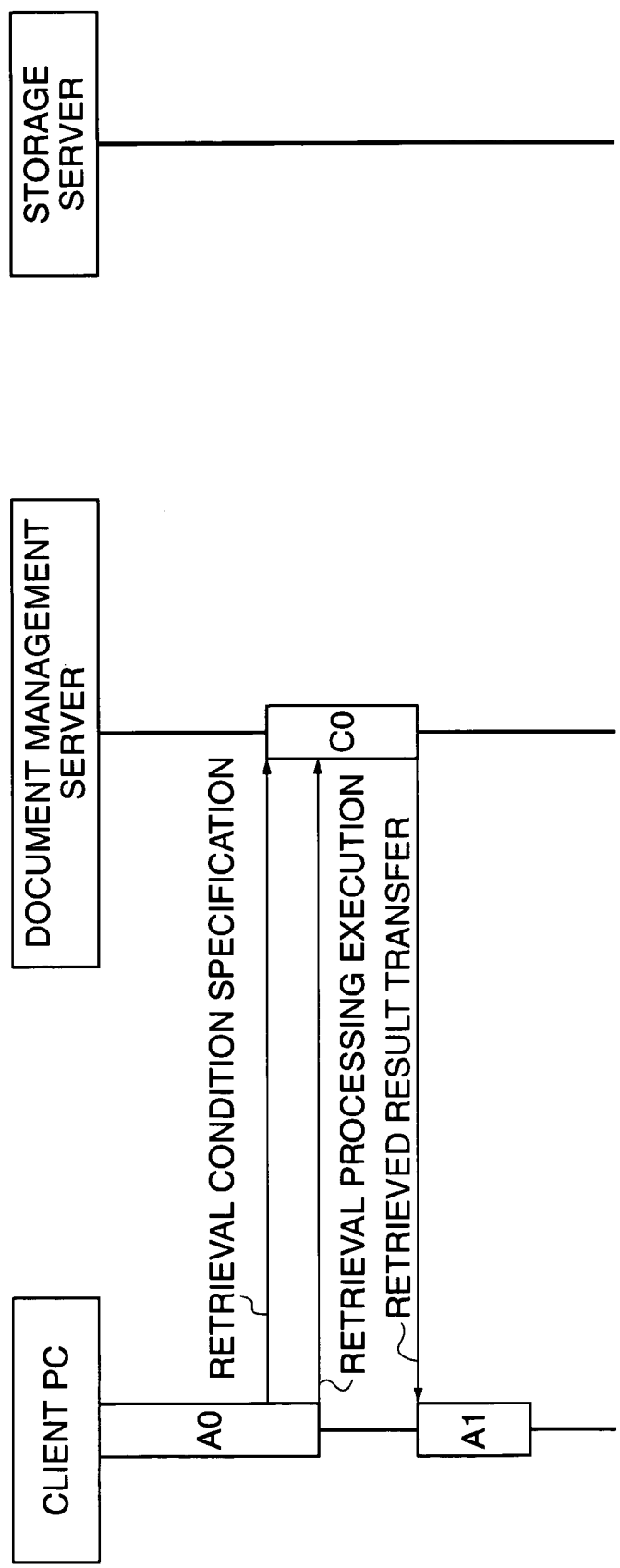
FIG. 23 is a diagram showing a flow of the retrieval processing of the fourth embodiment.

Next, a flow of the processing in which the document data stored in the document management server is retrieved from the client PC is described. FIG. 23 is a flowchart showing a flow of the retrieval processing of this embodiment.

When document data is retrieved from the client PC, first a retrieval condition needs to be determined. For example, there are the following specification methods regarding the retrieval condition of the document data.

Retrieval from the character string contained in a title
Retrieval from the author (creator)
Retrieval from the creation date
Retrieval from the character string contained in the text This retrieval condition is specified on the client PC and sent to the document management server. Subsequently, a retrieval processing execution instruction is sent (A0).

When the document management server receives the retrieval condition and the retrieval processing execution instruction from the client PC, it retrieves the document data stored in the document management server based on the retrieval condition. When the document management server completes retrieval processing, it transfers a retrieval result to the client PC (C0).

When the client PC receives the retrieval result from the document management server, it outputs the retrieval result (displays it on the screen). The user obtains desired document data from the output retrieval result (A1).

Figure 24:
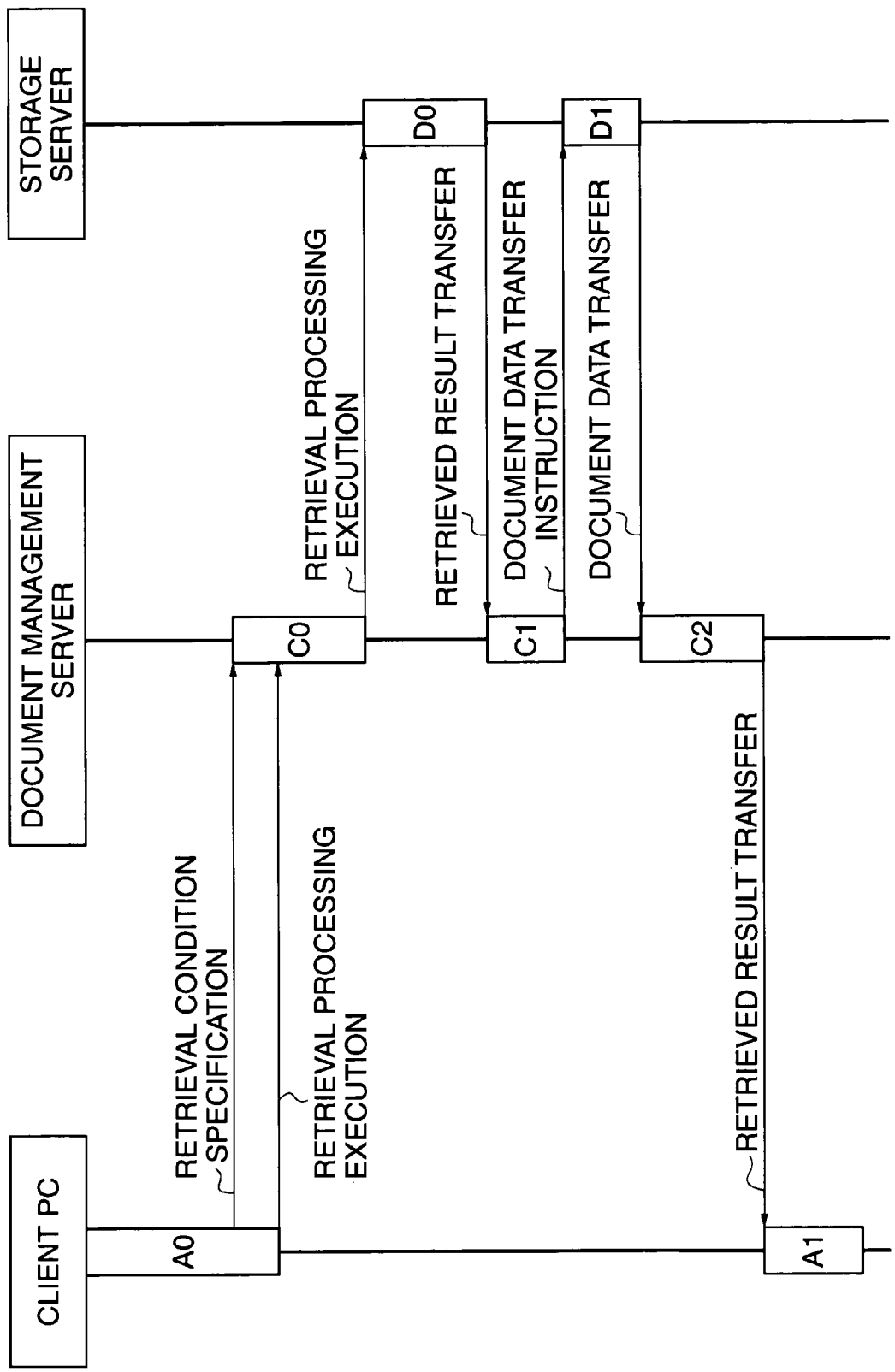
FIG. 24 is a diagram showing a flow of the recovery processing of the fourth embodiment.

Next, a flow of the processing in which the document data stored in the storage server is recovered is described. FIG. 24 is a flowchart showing a flow of the recovery processing of this embodiment. Similarly to the retrieval processing described previously, a retrieval condition is specified by the client PC and the retrieval condition and a retrieval processing execution instruction are sent to the document management server.

When the document management server receives the retrieval condition and the retrieval processing execution instruction, it retrieves the document data stored in the document management server based on the retrieval condition. As a result of this retrieval, if there is no document data that matches the condition, the document management server transfers the retrieval condition to the temporary storage server (C0).

When the temporary storage server receives the retrieval condition from the document management server, it retrieves the document data stored in the storage server based on the condition. When retrieval processing is completed, it transfers the retrieval result to the document management server (D0).

The document management server sends a document data transfer instruction to the temporary storage server based on the retrieval result received from the temporary storage server so that necessary document data can be transferred from the temporary storage server to the document management server (C1).

When the temporary server receives the document data transfer instruction from the document management server, it transfers the document data that matches instructed contents to the document control server (D1).

When the document management server receives document data from the temporary storage server, it transfers the retrieval result to the client PC (C2).

When the client PC receives the retrieval result from the document management, it outputs the retrieval result (plays it on the screen). The user obtains desired document data from the output retrieval result (A1).

In this embodiment, basically, a contract that uses the temporary storage server needs previously to be concluded so that the temporary storage server can be used. This contract may also be concluded for each user and for each document management server. The contract may also be concluded for each user's network environment.

In the contract for each user, even for the user who is using the same document management server, only the document data containing a deletion instruction from a contracted user is stored by the temporary storage server.

Further, in the contract for each document management server, when there are multiple document management servers in the user environment, only the document data of the document management server that is entering into a contract with the temporary storage server is transferred to the temporary storage server when the deletion instruction is given.

In this embodiment, fees are charged when the user uses the temporary storage server. The contents of accounting depend on the following items.

Shelf life (Storage for a certain period is free of charge.)
Number of stored document data items (Capacity)
Number of storage times (Document data for a specific number of items is free of charge.) Further, when a recovery instruction is given from the document management server within a fixed period of a shelf life, a service free of charge is also acceptable.

Fees may also be charged to the user every time a fee occurs. Further, it is also possible to pay a fixed amount of money previously as a prepaid system and subtract the amount from the prepaid amount every time a fee occurs.

In addition, although the system of this embodiment is described in the configuration in which there are a single document server and a single temporary storage server, the present invention is not limited to this configuration, and functions even in the configuration in which there are multiple document servers and multiple temporary storage servers.

Further, in this embodiment, document data is handled as deletion and recovery objects. This embodiment is not limited to the document data and can also apply to another data and information. For example, image data photographed by a digital camera, voice data, and numerical data is also acceptable.

Next, a fifth embodiment of the present invention is described. In the fifth embodiment, the deletion data storage service of a network personal digital terminal is used as an example.

That is, this embodiment relates to a data management service that uses a personal digital assistant connected to a network (the Internet). The personal digital assistant here indicates a cellular phone having the Internet connection function, an electronic note having the network connection function, and a mini-notebook PC.

The personal digital assistant connected to the network can read and write e-mails and browse home pages, and image data and document data are retained and can be browsed as the case may be. The personal digital assistant of today has the function of handling various data in this manner.

Most of personal digital assistants are reduced in their sizes since importance is attached to their portability. The reduction of their sizes is affected and the capacity of the storing unit inside a personal digital assistant is very small. Accordingly, since the capacity of the data that can be held by the personal digital assistant is small, the user uses the personal digital assistant to create data on it each time and as the case may be, transfer the data to it, and browse the data.

Data transfer sources are a personal computer the user possesses and a server on a network (the Internet).

Since the storage capacity of a personal digital terminal is small, the storage capacity is filled immediately when the user frequently uses the personal digital assistant and transfers multimedia data such as music and images to the personal digital assistant.

Under the circumstances, the user has had to transfer another data to the personal digital assistant after the user deletes the data already provided in the personal digital assistant and secures the capacity. However, when the data deleted on the personal digital assistant is required again, the data has been unable to be reused. In this embodiment, such a shortcoming is solved.

In this embodiment, when the user issues a deletion instruction to specific data, the data of which the deletion instruction is received on the user's personal digital assistant is transferred to the temporary storage server installed on the network via a network, and then the data provided in the personal digital assistant is deleted. Accordingly, when the data is required again, the deleted data can be recovered by making an inquiry from the personal digital assistant to the temporary storage server.

Figure 25:
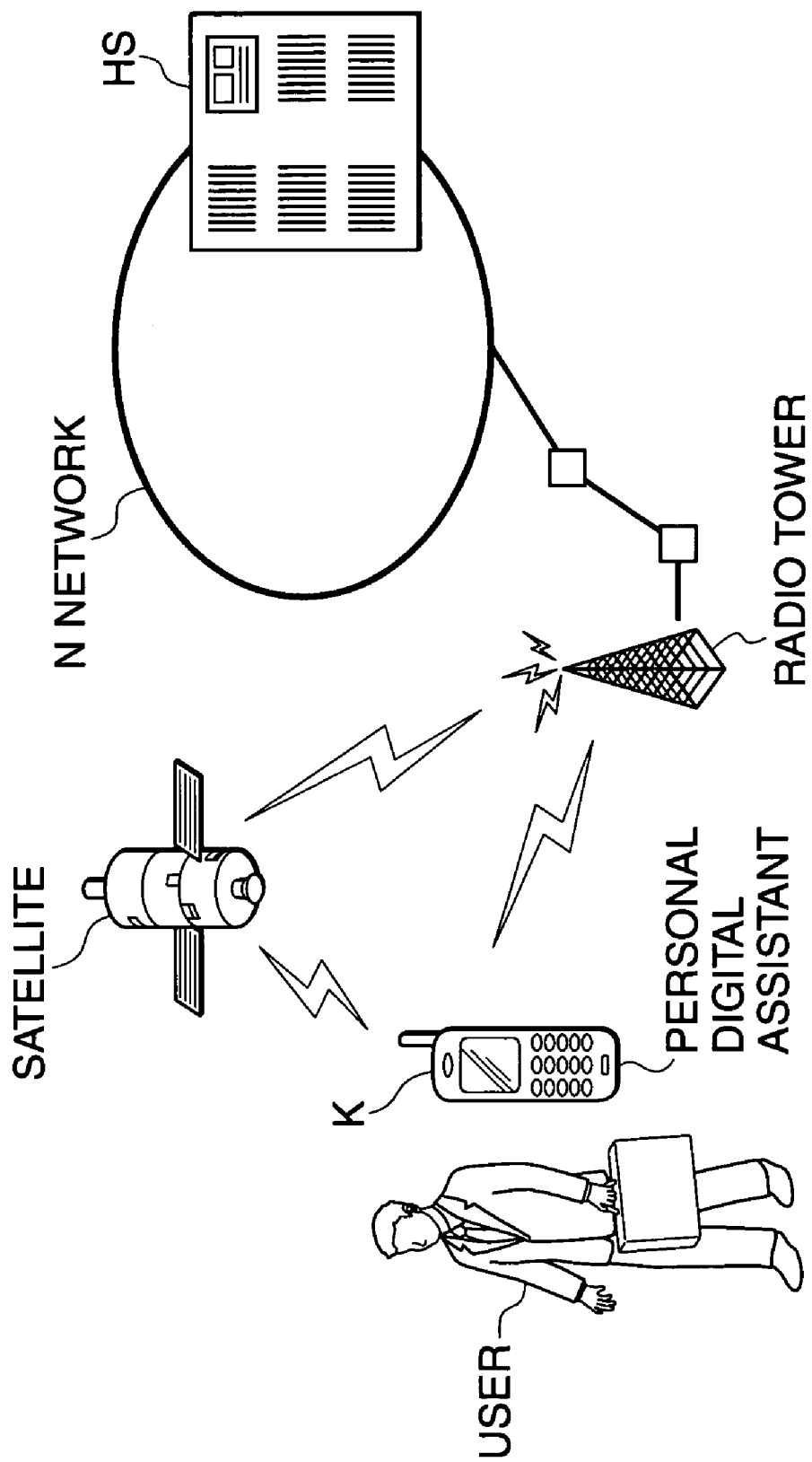
FIG. 25 is a block diagram for illustrating a system configuration of a fifth embodiment.

FIG. 25 is the system block diagram of this embodiment. A user's personal digital assistant K is connected to a network by radio. For radio connection, the personal digital assistant is connected to the network N via a radio tower or the like.

The personal digital assistant may also pass through a communication satellite or the like as a connecting path to the radio tower. The temporary storage server HS is connected onto the network N. The temporary storage server has a mass storage unit and can store data transferred from the personal digital assistant K. For data storage, the data is stored after an identifier that can uniquely identify the data is attached.

Figure 26:
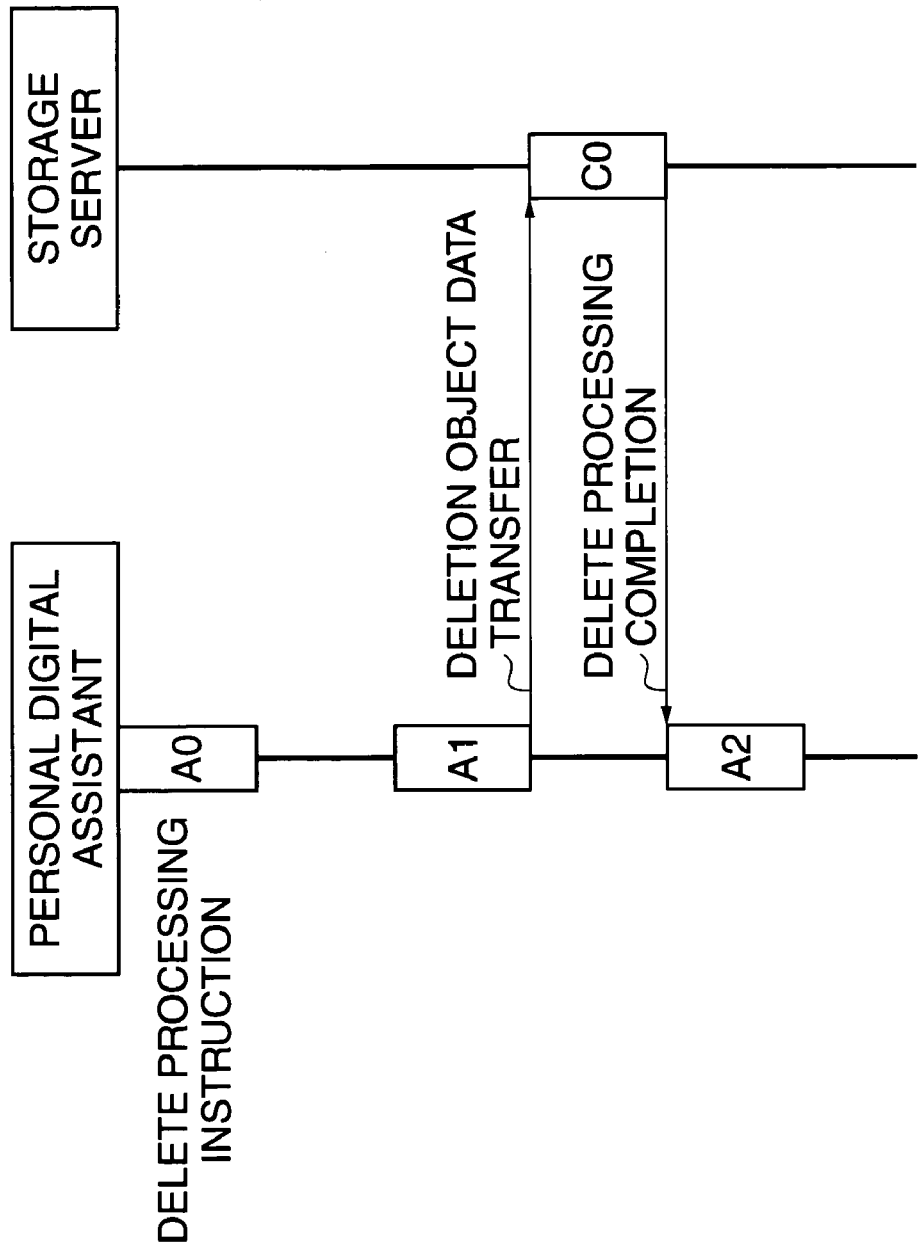
FIG. 26 is a diagram showing a flow of the delete processing in the system of the fifth embodiment.

FIG. 26 is a flowchart showing a flow of the delete processing in the system of this embodiment. First, the user specifies data to be deleted on the personal digital terminal and specifies delete processing execution (A0).

When the personal digital assistant receives a delete processing execution instruction, it transfers deletion object data to the temporary storage server (A1).

When the temporary server receives the data sent from the personal digital assistant, it stores the data into the storing unit of the temporary storage server (C0). This storing unit may be a magnetic medium such as an HDD a magneto-optical medium such as a DVD-RAM or a semiconductor medium such as a memory. Further, the storing unit does not have to be provided inside the temporary storage server.

When there is no storing unit inside the temporary storage server, a server that has the storing unit is installed where data can easily be accessed from the temporary storage server via the network. For data storage, the data is stored after an identifier that can uniquely identify the data is attached.

Identification data contains information identifies which personal digital assistant the data is sent from and information such as storage date and data sizes.

When the temporary storage server completes storage processing, it sends a delete processing completion status signal to the personal digital assistant.

When the personal digital assistant receives the delete processing completion status signal from the temporary storage server, it outputs a processing completion message to the user (displays it on the screen) (A2). Since the output of this delete processing completion message is not always necessary, the delete processing completion status signal may also be ignored.

The deletion object data from the personal digital assistant to the temporary storage server does not necessarily have to be transferred immediately after the delete processing execution is received from the user. The data may also be transferred at the time (for example, at night) when the user's personal digital assistant is not used. In that case, a delete processing completion status signal does not necessarily have to be received by the personal digital assistant at the end.

Figure 27:
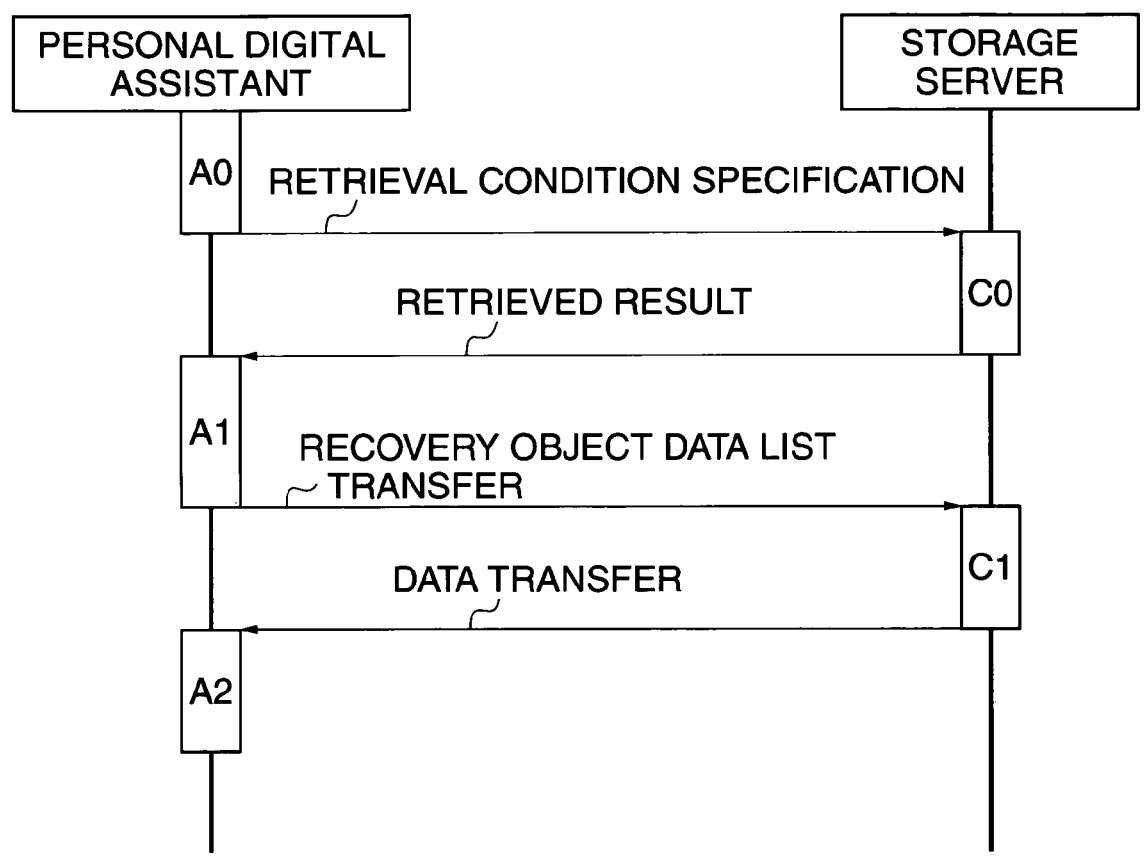
FIG. 27 is a diagram showing a flow of the recovery processing in the system of the fifth embodiment.

FIG. 27 is a flowchart showing a flow of the recovery processing in the system of this embodiment. When the user must recover the data that is not provided on the personal digital assistant and has been deleted before, first, conditions of the data to be recovered are specified. The conditions to be specified are the deletion date of data, title of data, creator of data, and data sender.

When the conditions of the data to be recovered are decided, the user instructs the personal digital assistant to retrieve the data that matches the condition. When the personal digital assistant receives a retrieval instruction from the user, it transfers a retrieval condition to the temporary storage server.

When the temporary storage server receives the retrieval condition from the personal digital assistant, it retrieves the data that matches this condition from the storing unit. When the retrieval processing is completed, the retrieval result is sent to the personal digital assistant (C0).

When the personal digital assistant receives the retrieval result from the temporary storage server, it outputs the retrieval result (displays it on the screen). The user selects the desired data to be recovered from the output retrieval result. When the selection of the data to be recovered is completed, the personal digital assistant transfers a recovery object data list to the temporary storage server (A1).

When the temporary storage server receives the recovery object data list, it transfers the data described in the list to the personal digital assistant (C1).

The personal digital assistant receives data from the temporary storage server (A2).

Data can be recovered according to the flow of the above processing. Further, in this example, a condition of the data to be recovered is specified and retrieved, and the data to be recovered is selected from a retrieval result. However, it is possible to browse a list of all data stored in the temporary storage server with the personal digital assistant and select from it the data to be recovered. At that time, a list of data is deleted by the personal digital assistant and the transferred data is displayed.

Further, in this embodiment, in the same manner as the fourth embodiment, a contract in which the temporary storage server is previously used and fees may also be charged in accordance with the use of the temporary storage server.

As described above, according to the present invention, the following effect is obtained. That is, unnecessary information is detected from electronic information stored in a storing unit and can quickly be deleted. As a result, only information necessary for the storing unit can be stored. Only the information useful for information retrieval is retrieved and the quality of a retrieval result can be improved.

The entire disclosure of Japanese Patent Application No. 2000-327970 filed on Oct. 27, 2000 including specification, claims, drawings and abstract is incorporated herein by reference in its entirety.

What is claimed is:

1. An electronic information management system for classification and storage of documents, comprising:
   a computer readable storage medium for storing an image of a document; and
   a processor including:
      image feature extracting means for extracting at least one feature of the image based on an instruction from a client, the feature associated with electronic information stored in storing means connected to a network;
      deciding means for deciding whether the electronic information is to be deleted based on the feature extracted by the image feature extracting means and on a condition specified by the client; and
      deleting means for deleting from the storing means via the network and via a deletion method specified by the client unnecessary electronic information decided to be deleted by the deciding means, the deleting means including means for deleting information that matches a predetermined condition, wherein:
         one or more documents are classified by the extracted feature,
         the extracted feature is at least one of a title of a document, a creation date of the document, a creator of the document, a file name of the document, an application name under which the document is created, a document keyword and a full text of the document, and
         one or more documents containing unnecessary electronic information are deleted from the storage medium.

2. The electronic information management server according to claim 1, wherein the extracted feature further comprises at least one of an aspect ratio of the image, a color distribution information of the image, a brightness distribution information of the image, and an edge distribution information of the image.

3. The electronic information management according to claim 1, wherein the deciding means decides whether the electronic information is to be deleted based on the client-specified condition including a condition that a first symbol encoded in the image corresponds to a second symbol associated with the electronic information.

4. The electronic information management server according to claim 1, wherein the deciding means decides whether the electronic information is to be deleted based on a feature of a second image similar to the image.

5. The electronic information management server according to claim 1, wherein the deciding means decides that other electronic information related to specific electronic information is also deleted together with the specific electronic information decided to be deleted based on the feature.

6. The electronic information management server according to claim 1, further comprising:
   temporarily storing means for temporarily storing electronic information sent via a network, wherein
   the deleting means deletes the unnecessary electronic information stored in the temporarily storing means at a predetermined timing.

7. The electronic information management server according to claim 6, wherein the deleting means deletes the unnecessary electronic information from the temporarily storing means after a predetermined period of time has elapsed.

8. The electronic information management server according to claim 1, wherein the client is an electronic information management client for classification and storage of documents that instructs deletion of unnecessary electronic information stored in storing means connected to a network, the electronic information management client comprising:
   instructing and operating means for instructing a feature associated with the electronic information to be deleted.

9. The electronic information management client according to claim 8, further comprising inputting means for inputting the feature and transferring it to the instructing and operating means.

10. An electronic information management system for classification and storage of documents, comprising:
   storing means connected to a network for storing electronic information; and
   a processor including:
      image feature extracting means for extracting at least one feature of the image based on an instruction from a client, the feature associated with the electronic information stored in the storing means;
      deciding means for deciding whether the electronic information is to be deleted based on the feature extracted by the image feature extracting means and on a condition specified by the client; and deleting means for deleting from the storing means via a deletion method specified by the client unnecessary electronic information decided to be deleted by the deciding means, the deleting means inek*desincluding means for deleting information thatmatches a predetermined condition, wherein:

one or more documents are classified by the extracted feature, the extracted feature is at least one of a title of a document, a creation date of the document, a creator of the document, a file name of the document, an application name under which the document is created, a document keyword and a full text of the document, and one or more documents containing unnecessary electronic information are deleted from the storing means.

11. An electronic information management system for classification and storage of documents, comprising:

storing means connected to a network for storing electronic information; and a processor including:

image feature extracting means for extracting at least one feature of the image, the feature associated with the electronic information stored in the storing means;

instructing and operating means for instructing the feature associated with the electronic information to be extracted;

deciding means for deciding whether the electronic information is to be deleted based on the feature and on a condition specified by the client; and deleting means for deleting from the storing means via a deletion method specified by the client unnecessary electronic information that is decided to be deleted by the deciding means, the deleting means including means for deleting information that matches a predetermined condition, wherein:

one or more documents are classified by the extracted feature, the extracted feature is at least one of a title of a document, a creation date of the document, a creator of the document, a file name of the document, an application name under which the document is created, a document keyword and a full text of the document, and one or more documents containing unnecessary electronic information are deleted from the storing means.

12. An electronic information management method for classifying and storing documents, comprising:

extracting at least one feature of an image of a document, the feature associated with electronic information stored in storing means connected to a network;

deciding whether the electronic information is to be deleted based on the feature previously extracted based on an instruction from a client; and deleting from the storing means via the network and via a deletion method specified by the client unnecessary electronic information that is decided to be deleted, the deleting further including deleting electronic information that matches a predetermined condition, wherein:

one or more documents are classified by the extracted feature, the extracted feature is at least one of a title of a document, a creation date of the document, a creator of the document, a file name of the document, an application name under which the document is created, a document keyword and a full text of the document, and one or more documents containing unnecessary electronic information are deleted from the storing means.

13. The electronic information management method according to claim 12, wherein the extracted feature further comprises at least one of an aspect ratio of the image, a color distribution information of the image, a brightness distribution information of the image, and an edge distribution information of the image.

14. The electronic information management method according to claim 12, wherein whether the electronic information is to be deleted is decided based on the client-specified condition including a condition that a first symbol encoded in the image corresponds to a second symbol associated with the electronic information.

15. The electronic information management method according to claim 12, wherein whether the electronic information is to be deleted is decided by obtaining a feature of a second image similar to the image.

16. The electronic information management method according to claim 12, wherein other electronic information related to specific electronic information is also decided as a deletion object together with the specific electronic information decided to be deleted based on the feature.

17. An electronic information management method according to claim 12, further comprising:

temporarily storing electronic information sent from a network; and deleting unnecessary temporarily stored electronic information at a predetermined timing.

18. The electronic information management method according to claim 17, wherein the unnecessary temporarily stored electronic information is deleted after a predetermined period of time has elapsed.

19. The electronic information management method according to claim 17, wherein the unnecessary temporarily stored electronic information is deleted based on an instruction from a sender of the electronic information.

20. The electronic information management method according to claim 17, wherein the temporarily stored electronic information is transferred based on an instruction from a sender of the electronic information.

21. An electronic information management method according to claim 12, further comprising:

inputting a feature associated with the electronic information to be deleted; and giving a deletion execution instruction to unnecessary electronic information that is to be deleted and extracted from the storing means according to the input feature.

22. An electronic information management method for classifying and documents, comprising:

storing predetermined electronic information;

extracting at least one feature of an image of a document, the feature associated with the stored electronic information;

deciding whether the electronic information is to be deleted based on the feature previously extracted based on an instruction from a client; and deleting unnecessary electronic information that is decided to be deleted via a deletion method specified by the client, the deleting including deleting electronic information that matches a predetermined condition, wherein:
one or more documents are classified by the extracted feature,
the extracted feature is at least one of a title of a document, a creation date of the document, a creator of the document, a file name of the document, an application name under which the document is created, a document keyword and a full text of the document, and
one or more documents containing unnecessary electronic information are deleted from the stored electronic information.

23. A recording medium readable by a computer, recording a program of instructions executable by the computer to perform an electronic information management method, the method comprising:
extracting at least one feature of an image of a document, the extracted feature associated with electronic information stored in storing means connected to a network;
deciding whether the electronic information is to be deleted based on the feature previously extracted based on an instruction from a client; and
deleting from the storing means via a network and via a deletion method specified by the client unnecessary electronic information that is decided to be deleted, the deleting includes deleting electronic information that matches a predetermined condition, wherein:
one or more documents are classified by the extracted feature,
the extracted feature is at least one of a title of a document, a creation date of the document, a creator of the document, a file name of the document, an application name under which the document is created, a document keyword and a full text of the document, and
one or more documents containing unnecessary electronic information are deleted from the storing means.

24. The recording medium according to claim 23, further comprising:
storing electronic information sent via a network in temporary storing means; and
deleting unnecessary electronic information stored in the temporary storing means at a predetermined timing.

25. A recording medium readable by a computer, recording a program of instructions executable by the computer to perform an electronic information management method for classifying and storing documents, when electronic information stored in storing means connected to a network is deleted, the method comprising:
accepting a condition from a client;
accepting at least one feature of an image of a document, the feature associated with the electronic information to be deleted; and
accepting a deletion execution instruction via a deletion method specified by the client for unnecessary electronic information that is to be deleted and extracted from the storing means according to the accepted feature and to the accepted condition, the deletion method further including deleting electronic information that matches a predetermined condition; wherein:
one or more documents are classified by the feature,
the feature is at least one of an aspect ratio of the image, a color distribution information of the image, a brightness distribution information of the image, an edge distribution information of the image, a title of a document, a creation date of the document, a creator of the document, a file name of the document, an application name under which the document is created, a document keyword and a full text of the document, and
one or more documents containing unnecessary electronic information are deleted from the storing means.

* * * * *